US011736995B2

(12) United States Patent
Han et al.

(10) Patent No.: US 11,736,995 B2
(45) Date of Patent: Aug. 22, 2023

(54) APPARATUS, SYSTEM AND METHOD TO IMPLEMENT A CONFIGURATION OF A TARGET NODE BASED ON A CHANGE IN THE SOURCE NODE CONFIGURATION DURING A CONDITIONAL HANDOVER

(71) Applicant: Intel Corporation, Santa Clara, CA (US)

(72) Inventors: Jaemin Han, Portland, OR (US); Yi Guo, Shanghai (CN); Bharat Shrestha, San Diego, CA (US); Candy Yiu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 17/022,968

(22) Filed: Sep. 16, 2020

(65) Prior Publication Data

US 2020/0413310 A1 Dec. 31, 2020

Related U.S. Application Data

(60) Provisional application No. 62/902,249, filed on Sep. 18, 2019.

(51) Int. Cl.

| | |
|---|---|
| ***H04W 36/00*** | (2009.01) |
| ***H04W 76/27*** | (2018.01) |
| ***H04L 5/00*** | (2006.01) |

(52) U.S. Cl.

CPC ..... *H04W 36/00837* (2018.08); *H04L 5/0055* (2013.01); *H04W 36/0061* (2013.01); *H04W 76/27* (2018.02)

(58) Field of Classification Search

None

See application file for complete search history.

(56) References Cited

U.S. PATENT DOCUMENTS

2022/0240138 A1* 7/2022 Hwang ............ H04W 36/0085

FOREIGN PATENT DOCUMENTS

WO WO-2020218587 A1 * 10/2020 ........ H04W 36/0058
WO WO-2021010890 A1 * 1/2021 ........ H04W 36/0016

OTHER PUBLICATIONS

3GPP TSG RAN Meeting #80, RP-181433, Agenda Item 9.1.10, “New WID: NR Mobility Enhancements,” New WID: NR Mobility Enhancements, La Jolla, USA, May 21-May 25, 2018 (5 pages).

(Continued)

*Primary Examiner* — Suhail Khan

(74) *Attorney, Agent, or Firm* — Alliance IP, LLC

(57) ABSTRACT

An apparatus of a source Radio Access Network (RAN) node, a system, and a method. The apparatus includes one or more processors that configures a user equipment (UE) for a conditional handover of the UE from the source RAN node to a candidate target RAN node based on at least one of a first configuration of the source RAN node or conditions to be met for execution of the conditional handover; and in response to a reconfiguration of the source RAN node to a second configuration, configure the UE for the conditional handover to the candidate target RAN node based on the second configuration by causing transmission of a message to the UE including information based on the second configuration.

25 Claims, 10 Drawing Sheets

1000

1002 configuring a user equipment (UE) for a conditional handover of the UE from a source RAN node to a candidate target RAN node based on at least one of a first configuration of the source RAN node or conditions to be met for execution of the conditional handover

1004 in response to a reconfiguration of the source RAN node to a second configuration prior to a change in the conditions for the conditional handover, configuring the UE for the conditional handover to the target RAN node based on the second configuration by causing transmission of a message to the source RAN node including information based on the second configuration

(56) References Cited

OTHER PUBLICATIONS

3GPP TSG RAN Meeting #80, RP-181475, Agenda Item 10.1.1, "New Work Item on Even Further Mobility Enhancement in E-UTRAN," China Telecom, Softbank (Email Discussion Moderator), La Jolla, CA, Jun. 11-14, 2018 (4 pages).
3GPP TSG-RAN WG2 Meeting #107, R2-1911733, Agenda Item 11.9.3.3, "Summary of [106#42] [NR/LTE/mob enh] CHO configuration", OPPO (rapporteur), Prague, Czech Republic, Aug. 26-Aug. 30, 2019 (26 pages).

* cited by examiner

APPARATUS, SYSTEM AND METHOD TO IMPLEMENT A CONFIGURATION OF A TARGET NODE BASED ON A CHANGE IN THE SOURCE NODE CONFIGURATION DURING A CONDITIONAL HANDOVER

CROSS REFERENCE TO RELATED APPLICATIONS

This application claims the benefit of and priority from U.S. Provisional Patent Application No. 62/902,249 entitled "TARGET NODE CONFIGURATION HANDLING FOR CONDITIONAL HANDOVER," filed Sep. 18, 2019, the entire disclosure of which is incorporated herein by reference.

FIELD

Various embodiments generally relate to the field of cellular communications, and particularly to handovers.

BACKGROUND

Current Third Generation Partnership Project (3GPP) Radio (NR) specifications (or 5G specifications) do not specifically address issues related to configuration of a target node in the event of a change in the configuration of a source node during a conditional handover.

DETAILED DESCRIPTION

Figure 1:
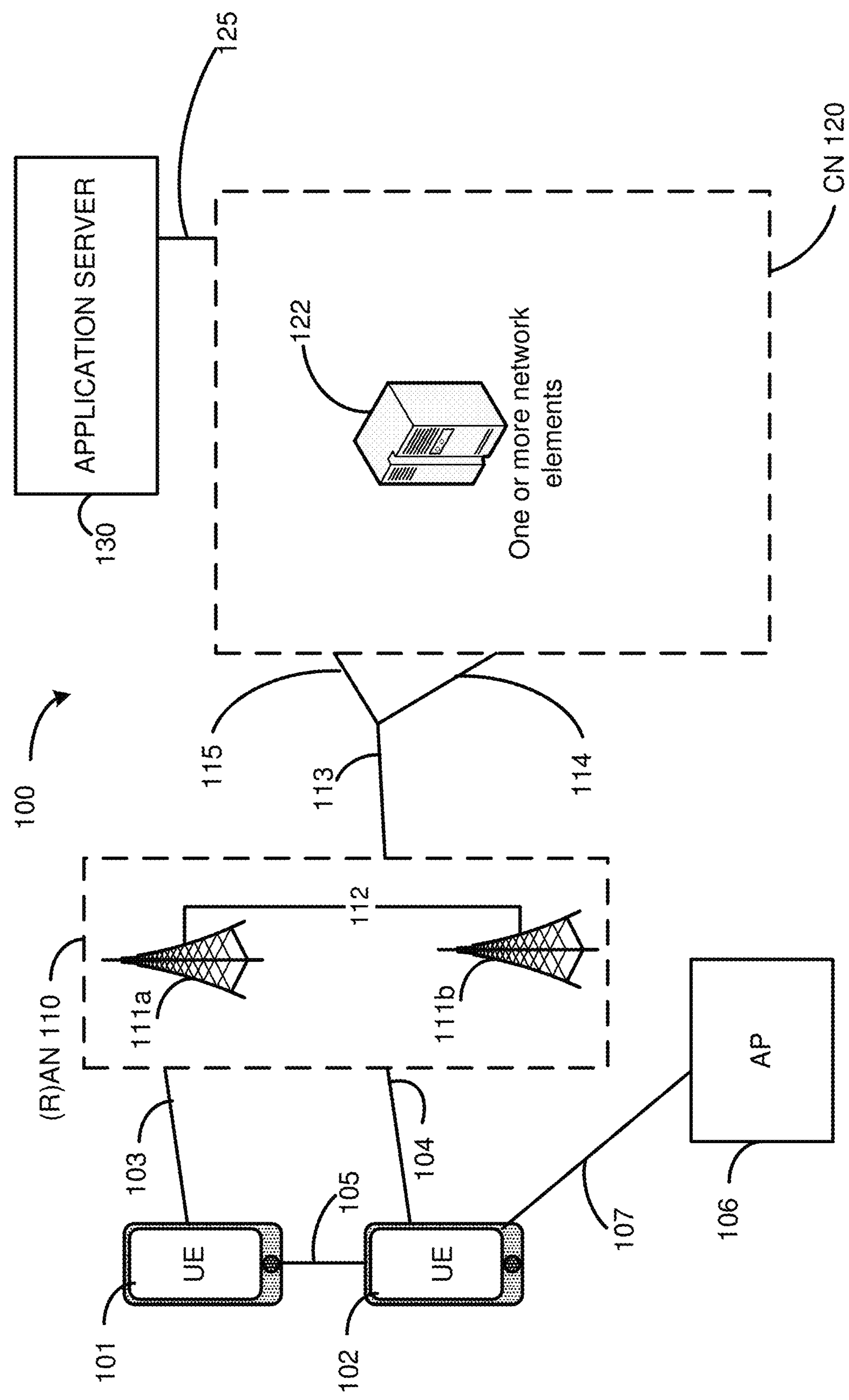
FIG. 1 illustrates an example architecture of a system of a network, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Some embodiments are related to Radio Access Network 3 (RAN3) and/or Radio Access Network 2 (RAN2) layer communications.

Conditional HO (CHO) is being studied as part of the Third Generation Partnership Project work items (WIs) "Even further Mobility Enhancement in E-UTRAN" and "NR Mobility Enhancement" approved in documents RP-181475 and RP-181433 respectively, where multiple potential target nodes can be prepared in advance among which the UE can then access one target node satisfying configured conditions.

For a conditional HO procedure, a source cell or source node (i.e. a source Long Term Evolution (LTE) evolved Node B (eNB) or a source New Radio (NR) Node B (gNB)), after having determined parameters for a CHO for a UE, may send a HO request message to one or more candidate target cells or target nodes (i.e. one or more candidate target eNBs or candidate target gNB), where the HO request message may include the source node's configuration. A candidate target node then sends a CHO command to the source node in a HO request acknowledgment message. The source node then sends a radio resource control (RRC) message to the UE including the CHO command from the candidate target node or cell, along with its own source node or cell configuration. The UE uses the CHO command from the candidate target cell in order to implement its own handover once one or more conditions for the CHO have been met.

Recently, RAN2 agreed that delta signaling is allowed for a CHO command from a candidate target cell (i.e. based on the latest source cell configuration). Given that, as suggested above, a CHO command is generated by a potential candidate target cell, and is transparently forwarded to the UE by the source node in a RRC message as in the legacy (non-conditional) HO, the existing WI agreement on delta signaling for CHO command from a candidate target cell leaves some uncertainty on how to handle candidate target cell configurations in CHO.

In particular, the source cell configuration could be changed during CHO before the UE handover to a target node has been executed. In CHO, the UE does not immediately execute HO upon receiving a command from the source node. As a result, the network is free to modify the source cell configuration whenever desired until the CHO is triggered by virtue of configured conditions having been satisfied. In addition, the candidate target cells are not always prepared simultaneously—Delta signaling for CHO commands prepared by different candidate target cells could be based on different source cell configurations.

Embodiments provide mechanisms for a clear handling of delta signaling for target cell configurations in the UE and the network during a CHO so that a change in the source cell configuration during a configured CHO does not jeopardize executing a CHO that follows after a UE has been configured for a CHO by a source node.

The 3GPP work group 2 (WG2) document R2-1911733 "An outcome of email discussion for CHO configuration," at Section 2.2, option 2, briefly discusses one option for the UE to store a delta configuration only. This requires a network to update the CHO command previously configured in the UE based on the latest source configuration, if the source configuration is modified, but the stage-3 details for such signaling between the source cell and a potential target cell were nascent at the time of R2-1911733. Another option that has been briefly discussed in R2-1911733 is for the UE to store complete target cell configuration. Again, the details for such a configuration were nascent at the time of R2-1911733.

In the present disclosure we propose several embodiments.

According to a first embodiment, the source node may inform one or more candidate target cells regarding its updated/latest source configuration. A candidate target cell may then update the delta CHO command that it had previously sent to the UE and therefore configured in the UE based on the provided updated source configuration. According to this first embodiment, since the network updates a delta CHO commands based on the latest source configuration, and reconfigures the delta CHO commands accordingly, the UE needs to store the received candidate target cell configuration only for each candidate target cell that sent a delta CHO command. However, network signaling between the source node and candidate target nodes is required according to the first embodiment for reconfiguration of target cell configurations by way of their respective delta CHO commands, which is not efficient, especially when many candidate target cells are involved. Moreover, a size of the RRC reconfiguration message can be large if the UE has been configured with many candidate target cells.

According to a second embodiment, the source node may inform one or more candidate target nodes and the UE regarding its updated/latest source node configuration, and if accepted by a candidate target cell, both the candidate target node and the UE follow the existing delta CHO command but based on the latest source configuration. According to the second embodiment, the candidate target node and the UE both know the latest source configuration. In this embodiment, the delta CHO command is not updated based on the updated source configuration, and is therefore note sent by the candidate target node to the source node and then forwarded by the source node to the UE. Embodiment two offers a variant of embodiment one by skipping the reconfiguration of already configured target cell configurations when the source configuration is modified. According to the second embodiment, the delta CHO command is still based on the old source configuration, but the UE uses the updated source configuration that yields a change of target cell configuration from the previous target node configuration admitted/configured by the candidate target cell. If the candidate target node effects this change, the UE may then undergo a handover from the source node to the candidate target node based on the updated source node configuration. Similar to the first embodiment, the second embodiment still requires network signaling between the source node and the potential target nodes, for which target nodes already configured delta CHO commands to the UE. According to some options within the second embodiment, if a candidate target cell does not accept the updated source configuration as a basis for CHO, a mechanism based on the first embodiment may follow, and/or the candidate target cell can generate a full target cell configuration for the CHO, and/or the candidate target node may reject the HO request. In the latter case, a HO cancel event/communication may follow.

According to a third embodiment, a UE does not execute CHO for a candidate target cell for which the updated target cell configuration is not received in the form of an updated CHO command after the source configuration is changed and the change configuration signaled to the UE by the source node. The source node may not even contact targets who already provided delta CHO command with its updated configuration, and may simply initiate HO cancel when modifying its configuration. In the alternative, the source node may contact those targets as in Embodiment 2 where the UE does not perform CHO in case the target rejects the request and does not provide the updated target cell configuration.

According to a fourth embodiment, a UE may separately store a baseline source configuration for each delta CHO command. The fourth embodiment provides a UE-based solution that does not require reconfiguration of target cell configurations or any relevant network signaling when the source configuration changes during a CHO procedure. However, the baseline source configuration could be different for different delta CHO commands, which could consume large memory in the UE. However, UE memory consumption could be reduced by storing only the delta for the change of the source configuration. Nevertheless, under the latter regime, some initial full source configuration should still be stored separately at the UE at a minimum.

According to a fifth embodiment, a UE may convert an existing delta CHO command into new a delta CHO command based on the latest source configuration. The fifth embodiment provides a variant of the fourth embodiment, where the UE further processes and converts the previously configured delta CHO command, which was based on the old source configuration, into new delta CHO command based on the latest source configuration. Namely, all the delta CHO commands can be maintained based upon the latest source configuration. As a result, memory consumption according to the fifth embodiment is minimized similar to the case in the first embodiment where the UE does not need to store a source node configuration separately because the current source configuration is baseline for all the delta CHO commands configured to the UE. However, the fifth embodiment does require additional UE processing and battery consumption whenever the source configuration is modified.

The first, second, fourth and fifth embodiments will be addressed in further detail in the description below.

As noted previously, according to the first embodiment, the source node may inform one or more candidate target nodes regarding its updated/latest source configuration. A candidate target cell may then update the delta CHO command that it had previously sent to the UE and therefore configured in the UE based on the provided updated source configuration. The source node can request and indicate to a candidate target cell to update its delta CHO command based on the provided source configuration so that the target can provide the updated delta CHO command in the reply, such as in a HO request acknowledge message to the source node, to be forwarded to the UE by the source node. The indication regarding a source node configuration change from the source node to a candidate target cell, or the indication regarding a source node configuration change in the form of a new delta CHO command from the candidate target cell to the source node, may be carried by a new message, or within existing messages in 3GPP technical specifications. Some example implementations in the stage-3 technical specification (TS) TS 36.423 (for LTE) and TS 38.423 (for NR) follow below.

For TS 36.423, Section 9.1.1.1 may state as follows below.

9.1.1.1 Handover Request

This message is sent by the source eNB to the target eNB to request the preparation of resources for a handover.

Direction: source eNB→target eNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target node ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 . . . $2^{32}$ − 1) | MME UE S1AP ID allocated at the MME | — | |
| >UE Security Capabilities | M | | 9.2.29 | | — | |
| >AS Security Information | M | | 9.2.30 | | — | |
| >UE Aggregate Maximum Bit Rate | M | | 9.2.12 | | — | |
| >Subscriber Profile ID for RAT/Frequency priority | O | | 9.2.25 | | — | |
| >E-RABs To Be Setup List | | 1 | | | — | |
| >>E-RABs To Be Setup Item | | 1 . . . <maxnoofBearers> | | | EACH | ignore |
| >>>E-RAB ID | M | | 9.2.23 | | — | |
| >>>E-RAB Level QoS Parameters | M | | 9.2.9 | Includes necessary QoS parameters | — | |
| >>>DL Forwarding | O | | 9.2.5 | | — | |
| >>>UL GTP Tunnel Endpoint | M | | GTP Tunnel Endpoint 9.2.1 | SGW endpoint of the S1 transport bearer. For delivery of UL PDUs. | — | |
| >>>Bearer Type | O | | 9.2.92 | | YES | reject |
| >RRC Context | M | | OCTET STRING | Includes the RRC HandoverPreparationInformation message as defined in subclause 10.2.2 of TS 36.331 [9], or the RRC HandoverPreparationInformation-NB message as defined in 10.6.2 of TS 36.331 [9]. | — | |
| >Handover Restriction List | O | | 9.2.3 | | — | |
| >Location Reporting Information | O | | 9.2.21 | Includes the necessary parameters for location reporting | — | |
| >Management Based MDT Allowed | O | | 9.2.59 | | YES | ignore |
| >Management Based MDT PLMN List | O | | MDT PLMN List 9.2.64 | | YES | ignore |
| >UE Sidelink Aggregate | O | | 9.2.97 | This IE applies only if the UE is | YES | Ignore |

-continued

| | | | | | |
|---|---|---|---|---|---|
| Maximum Bit Rate | | | authorized for V2X services. | | |
| UE History Information | M | 9.2.38 | Same definition as in TS 36.413 [4] | YES | ignore |
| Trace Activation | O | 9.2.2 | | YES | ignore |
| SRVCC Operation Possible | O | 9.2.33 | | YES | ignore |
| CSG Membership Status | O | 9.2.52 | | YES | reject |
| Mobility Information | O | BIT STRING (SIZE (32)) | Information related to the handover; the source eNB provides it in order to enable later analysis of the conditions that led to a wrong HO. | YES | ignore |
| Masked IMEISV | O | 9.2.69 | | YES | ignore |
| UE History Information from the UE | O | OCTET STRING | VisitedCellInfoList contained in the UEInformationResponse message (TS 36.331 [9]) | YES | ignore |
| Expected UE Behaviour | O | 9.2.70 | | YES | ignore |
| ProSe Authorized | O | 9.2.78 | | YES | ignore |
| UE Context Reference at the SeNB | O | | | YES | ignore |
| >Global SeNB ID | M | Global eNB ID 9.2.22 | | | |
| >SeNB UE X2AP ID | M | eNB UE X2AP ID 9.2.24 | Allocated at the SeNB | | |
| >SeNB UE X2AP ID Extension | O | Extended eNB UE X2AP ID 9.2.86 | Allocated at the SeNB | | |
| Old eNB UE X2AP ID Extension | O | Extended eNB UE X2AP ID 9.2.86 | Allocated at the source eNB | YES | reject |
| V2X Services Authorized | O | 9.2.93 | | YES | ignore |
| UE Context Reference at the WT | O | | | YES | ignore |
| >WT ID | M | 9.2.95 | | | |
| >WT UE XwAP ID | M | 9.2.96 | | | |
| UE Context Reference at the SgNB | O | | | YES | ignore |
| >Global en-gNB ID | M | 9.2.112 | | | |
| >SgNB UE X2AP ID | M | en-gNB UE X2AP ID 9.2.100 | Allocated at the SgNB. | — | |
| NR UE Security Capabilities | O | 9.2.107 | | YES | ignore |
| Aerial UE subscription information | O | 9.2.129 | | YES | ignore |
| Subscription Based UE Differentiation Information | O | 9.2.136 | | YES | ignore |
| Update CHO Command | O | Enumerated (True, . . .) | | Yes | ignore |

| Range bound | Explanation |
|---|---|
| maxnoofBearers | Maximum no. of E-RABs. Value is 256 |
| maxnoofMDTPLMNs | PLMNs in the Management Based MDT PLMN list. Value is 16. |

A handover request X2AP message from a source eNB to a candidate target eNB according to the above table may therefore include an enumerated information element including a CHO update instruction to the candidate target eNB to cause the candidate target eNB to generate an updated CHO command based on a RRC context container from the source eNB to the candidate target eNB comprising HO information including a latest source eNB configuration. The updated CHO command is sent by the candidate target eNB to the source eNB, and thereafter forwarded by the source eNB to the UE.

For TS 36.423, Section 9.1.1.2 may state as follows below.

9.1.1.2 Handover Request Acknowledge

This message is sent by the target eNB to inform the source eNB about the prepared resources at the target.

Direction: target eNB→source eNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| >E-RABs Admitted Item | | 1 . . . <maxnoofBearers> | | | EACH | ignore |
| >>E-RAB ID | M | | 9.2.23 | | — | |
| >>UL GTP Tunnel Endpoint | O | | GTP Tunnel Endpoint 9.2.1 | Identifies the X2 transport bearer used for forwarding of UL PDUs | — | |
| >>DL GTP Tunnel Endpoint | O | | GTP Tunnel Endpoint 9.2.1 | Identifies the X2 transport bearer. used for forwarding of DL PDUs | — | |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Updated Target eNB To Source eNB Transparent Container | O | | OCTET STRING | Includes the RRC E-UTRA Handover Command message as defined in subclause 10.2.2 in TS 36.331 [9] | Yes | ignore |
| Criticality Diagnostics | O | | 9.2.7 | | YES | ignore |
| UE Context Kept Indicator | O | | 9.2.85 | | YES | ignore |
| Old eNB UE X2AP ID Extension | O | | Extended eNB UE X2AP ID 9.2.86 | Allocated at the source eNB | YES | ignore |

-continued

| | | | | | | |
|---|---|---|---|---|---|---|
| New eNB UE X2AP ID Extension | O | | Extended eNB UE X2AP ID 9.2.86 | Allocated at the target eNB | YES | reject |
| WT UE Context Kept Indicator | O | | UE Context Kept Indicator 9.2.85 | Indicates that the WT has acknowledged to keep the UE context | YES | ignore |

| Range bound | Explanation |
|---|---|
| maxnoofBearers | Maximum no. of E-RABs. Value is 256 |

A handover request acknowledge X2AP message from a candidate target eNB to a source eNB according to the above table may therefore include an information element including an Updated Target eNB To Source eNB Transparent Container carrying an updated CHO command message in the form of a RRC message to the source eNB to cause the source eNB to send the updated CHO command to the UE. The CHO command message may be in response to the update CHO command instruction from the source eNB to the candidate target eNB.

For TS 38.423, Section 9.1.1.1 may state as follows below.

9.1.1.1 Handover Request

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID reference | M | | NG-RAN node UE XnAP ID 9.2.3.16 | Allocated at the source NG-RAN node | YES | reject |
| Cause | M | | 9.2.3.2 | | YES | reject |
| Target node Global ID | M | | 9.2.3.25 | Includes either an E-UTRA CGI or an NR CGI | YES | reject |
| GUAMI | M | | 9.2.3.24 | | YES | reject |
| UE Context Information | | 1 | | | YES | reject |
| >NG-C UE associated Signalling reference | M | | AMF UE NGAP ID 9.2.3.26 | Allocated at the AMF on the source NG-C connection. | — | |
| >Signalling TNL association address at source NG-C side | M | | CP Transport Layer Information 9.2.3.31 | This IE indicates the AMF's IP address of the SCTP association used at the source NG-C interface instance. | — | |
| >UE Security Capabilities | M | | 9.2.3.49 | | — | |
| >AS Security Information | M | | 9.2.3.50 | | — | |
| >Index to RAT/Frequency Selection Priority | O | | 9.2.3.23 | | — | |
| >UE Aggregate Maximum Bit Rate | M | | 9.2.3.17 | | — | |
| >PDU Session Resources To Be Setup List | | 1 | 9.2.1.1 | Similar to NG-C signalling, containing UL tunnel information per PDU Session Resource; | — | |

-continued

| IE/Group Name | Presence | Range | IE type and reference | Semantics description | Criticality | Assigned Criticality |
|---|---|---|---|---|---|---|
| | | | | and in addition, the source side QoS flow ⇔ DRB mapping | | |
| >RRC Context | M | | OCTET STRING | Either includes the HandoverPreparationInformation message as defined in subclause 10.2.2. of TS 36.331 [14], if the target NG-RAN node is an ng-eNB, or the HandoverPreparationInformation message as defined in subclause 11.2.2 of TS 38.331 [10], if the target NG-RAN node is a gNB. | — | |
| >Location Reporting Information | O | | 9.2.3.47 | Includes the necessary parameters for location reporting. | — | |
| >Mobility Restriction List | O | | 9.2.3.53 | | — | |
| Trace Activation | O | | 9.2.3.55 | | YES | ignore |
| Masked IMEISV | O | | 9.2.3.32 | | YES | ignore |
| UE History Information | M | | 9.2.3.64 | | YES | ignore |
| UE Context Reference at the S-NG-RAN node | O | | | | YES | ignore |
| >Global NG-RAN Node ID | M | | 9.2.2.3 | | — | |
| >S-NG-RAN node UE XnAP ID | M | | NG-RAN node UE XnAP ID 9.2.3.16 | | — | |
| Update CHO Command | O | | Enumerated (True, . . .) | | Yes | ignore |

A handover request XnAP message from a source gNB to a candidate target gNB according to the above table may therefore include an enumerated information element including a CHO update instruction to the candidate target gNB to cause the candidate target gNB to generate an updated CHO command based on a RRC context container from the source gNB to the candidate target gNB comprising HO information including a latest source gNB configuration. The updated CHO command is sent by the candidate target gNB to the source gNB, and thereafter forwarded by the source gNB to the UE.

For TS 38.423, Section 9.1.1.2 may state as follows below.

9.1.1.2 HANDOVER REQUEST ACKNOWLEDGE

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |

-continued

| IE/Group Name | Presence | Range | IE type and reference | Semantics description | Criticality | Assigned Criticality |
|---|---|---|---|---|---|---|
| Target NG-RAN node UE XnAP ID | M | | NG-RAN node UE XnAP ID 9.2.3.16 | Allocated at the target NG-RAN node | YES | ignore |
| PDU Session Resources Admitted List | M | | 9.2.1.2 | | YES | ignore |
| PDU Session Resources Not Admitted List | O | | 9.2.1.3 | | YES | ignore |
| Target NG-RAN node To Source NG-RAN node Transparent Container | M | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. | YES | ignore |
| Updated Target NG-RAN node To Source NG-RAN node Transparent Container | O | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. | YES | ignore |
| UE Context Kept Indicator | O | | 9.2.3.68 | | YES | ignore |
| Criticality Diagnostics | O | | 9.2.3.3 | | YES | ignore |

A handover request acknowledge XnAP message from a candidate target gNB to a source gNB according to the above table may therefore include an information element including an Updated Target gNB To Source gNB Transparent Container carrying an updated CHO command message in the form of a RRC message to the source gNB to cause the source gNB to send the updated CHO command to the UE. The CHO command message may be in response to the update CHO command instruction from the source gNB to the candidate target gNB.

As noted previously, in the second embodiment, the source node may inform one or more candidate target nodes and the UE regarding its updated/latest source configuration, and if accepted by a candidate target cell, both the candidate target cell and the UE follow the existing delta CHO command but based on the latest source configuration. According to the second embodiment, the candidate target node can indicate whether it accepts the modified target cell configuration based on the latest source configuration provided from the source node. If the modified target cell configuration is accepted by the target node, no RRC reconfiguration is necessary by way of an updated target cell CHO command forwarded by the source node to the UE. If the candidate target cell does not accept the source configuration change, however, according to one option, it may send a new delta CHO command to the source node to be forwarded to the UE again, as in the first embodiment. The indication regarding the acceptance by a candidate target node of a new target cell configuration may be carried by a new message, or within existing messages in 3GPP technical specifications. Some example implementations in the stage-3 technical specification (TS) TS 36.423 (for LTE) and TS 38.423 (for NR) follow below.

For TS 36.423, Section 9.1.1.2 may state as follows below.

9.1.1.2 HANDOVER REQUEST ACKNOWLEDGE

This message is sent by the target eNB to inform the source eNB about the prepared resources at the target.

Direction: target eNB→source eNB.

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| >E-RABs Admitted Item | | 1 . . . <maxnoofBearers> | | | EACH | ignore |
| >>E-RAB ID | M | | 9.2.23 | | — | |
| >>ULGTP Tunnel Endpoint | O | | GTP Tunnel Endpoint 9.2.1 | Identifies the X2 transport bearer used for forwarding of UL PDUs | — | |
| >>DL GTP Tunnel Endpoint | O | | GTP Tunnel Endpoint 9.2.1 | Identifies the X2 transport bearer. used for forwarding of DL PDUs | — | |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Modified Target node Configuration Accept Indicator | O | | Enumerated (True, . . .) | | Yes | ignore |
| Criticality Diagnostics | O | | 9.2.7 | | YES | ignore |
| UE Context Kept Indicator | O | | 9.2.85 | | YES | ignore |
| Old eNB UE X2AP ID Extension | O | | Extended eNB UE X2AP ID 9.2.86 | Allocated at the source eNB | YES | ignore |
| New eNB UE X2AP ID Extension | O | | Extended eNB UEX2AP ID 9.2.86 | Allocated at the target eNB | YES | reject |

-continued

| | | | | | | |
|---|---|---|---|---|---|---|
| WT UE Context Kept Indicator | O | | UE Context Kept Indicator 9.2.85 | Indicates that the WT has acknowledged to keep the UE context | YES | ignore |

| Range bound | Explanation |
|---|---|
| maxnoofBearers | Maximum no. of E-RABs. Value is 256 |

A handover request acknowledge X2AP message from a candidate target eNB to a source eNB according to the above table may therefore include an information element including an enumerated Modified Target node Configuration Accept Indicator. The Modified Target node Configuration Accept Indicator may be included in response to a message including information on a modified source eNB configuration from the source eNB to the candidate target eNB.

For TS 38.423, Section 9.1.1.2 may state as follows below.

9.1.1.2 HANDOVER REQUEST ACKNOWLEDGE

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Source NG-RAN node UE XnAP ID | M | | NG-RAN node UE XnAP ID 9.2.3.16 | Allocated at the source NG-RAN node | YES | ignore |
| Target NG-RAN node UE XnAP ID | M | | NG-RAN node UE XnAP ID 9.2.3.16 | Allocated at the target NG-RAN node | YES | ignore |
| PDU Session Resources Admitted List | M | | 9.2.1.2 | | YES | ignore |
| PDU Session Resources Not Admitted List | O | | 9.2.1.3 | | YES | ignore |
| Target NG-RAN node To Source NG-RAN node Transparent Container | M | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. | YES | ignore |
| Modified Target node Configuration Accept Indicator | O | | Enumerated (True, . . .) | | YES | ignore |
| UE Context Kept Indicator | O | | 9.2.3.68 | | YES | ignore |
| Criticality Diagnostics | O | | 9.2.3.3 | | YES | ignore |

A handover request acknowledge XnAP message from a candidate target gNB to a source gNB according to the above table may therefore include an information element including an enumerated Modified Target node Configuration Accept Indicator. The Modified Target node Configuration Accept Indicator may be included in response to a message including information on a modified source gNB configuration from the source gNB to the candidate target gNB.

According to the fourth embodiment, as previously noted, the UE may separately store a baseline source configuration for each delta CHO command. Considering a scenario where the UE is already configured by way of a delta CHO command for a candidate target cell A, which is baselined on a source configuration 0, then:

SRC Configuration 0+Δ Target cell *A* CHO CMD=>Target cell *A* Full Configuration where "SRC" refers to the source node, and "CHO CMD" refers to a CHO command.

Assuming that the source node updates its source configuration to SRC Configuration 1 and the UE is configured with another delta CHO command for target cell B based on SRC Configuration 1, then:

SRC Configuration 1+Δ Target cell *B* CHO CMD=>Target cell *B* Full Configuration Where multiple candidate target cells exist, such as target cell A and target cell B, the UE may need to separately store SRC Configuration 0 and SRC Configuration 1, as a baseline for A Target cell A CHO CMD and A Target cell B CHO CMD respectively in order to be able to restore a full target cell configuration to be used upon CHO execution for each of target cell A and target cell B. However, according to an alternative, if delta signaling is used from the source node to signal change of source configuration to the UE, the information in such delta signaling can be stored at the UE instead, and thus reduce memory consumption. Even where the source node does not use delta signaling to signal a change in its configuration, the UE may generate the delta for storing by comparing the source configuration that have been configured in the UE from the full source configuration that is received/updated from the source node, and may thus reduce memory consumption. If we denote Δ SRC1 as a delta for SRC Configuration 1 from SRC Configuration 0, then the UE can restore target cell B full configuration by using Δ SRC1 and without storing the full SRC Configuration 1 separately, as suggested by the below:

SRC Configuration 0+Δ SRC1+Δ Target cell *B* CHO CMD=>Target cell *B* Full Configuration.

According to the fifth embodiment, as noted previously, the UE may convert an existing delta CHO command into new delta based on the latest source configuration. According to this embodiment, the source node may send its updated configuration information to the UE without sending it to a candidate target node. From the above example scenario in the fourth embodiment, the UE can, instead of receiving an updated CHO command from the candidate target cell, process and convert the candidate target cell configuration on its own, e.g. A Target cell A CHO CMD, into a new delta, based the updated/latest source configuration by using the following solution:

SRC Configuration 0+Δ Target cell *A* CHO CMD=>Target cell *A* Full Configuration 1.

Target cell *A* Full Configuration−SRC Configuration 1=>new Δ Target cell *A* CHO CMD 2.

Since all the delta CHO commands configured in the UE can be maintained based upon the latest source configuration that the UE is currently operating, the UE does not have to separately store a source configuration for restoring full target cell FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 101 may be NB-IoT UEs 101. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 111 and UEs 101 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 101 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 101 may be MF UEs 101. MF UEs 101 are LTE-based UEs 101 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 101 may be NB-IoT UEs 101 that operate according to MF. In such embodiments, these UEs 101 may be referred to as "MF NB-IoT UEs 101," however, the term "NB-IoT UE 101" may refer to an "MF UE 101" or an "MF and NB-IoT UE 101" unless stated otherwise. Thus, the terms "NB-IoT UE 101," "MF UE 101," and "MF NB-IoT UE 101" may be used interchangeably throughout the present disclosure.

The UEs 101 may be configured to connect, for example, communicatively couple, with an or RAN 110. In embodiments, the RAN 110 may be an NG RAN or a 5G RAN, an E-UTRAN, an MF RAN, or a legacy RAN, such as a UTRAN or GERAN. As used herein, the term "NG RAN" or the like may refer to a RAN 110 that operates in an NR or 5G system 100, the term "E-UTRAN" or the like may refer to a RAN 110 that operates in an LTE or 4G system 100, and the term "MF RAN" or the like refers to a RAN 110 that operates in an MF system 100. The UEs 101 utilize connections (or channels) 103 and 104, respectively, each of which comprises a physical communications interface or layer (discussed in further detail below). The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more physical and/or logical channels, including but not limited to the PSCCH, PSSCH, PSDCH, and PSBCH.

The UE 101*b* is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101*b*, RAN 110, and AP 106 may be configured to utilize LWA operation and/or LWIP operation. The LWA operation may involve the UE 101*b* in RRC_CONNECTED being configured by a RAN node 111*a-b* to utilize radio resources of LTE and WLAN. LWIP operation may involve the UE 101*b* using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, gNodeBs, RAN nodes, eNBs, eNodeBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (e.g., a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra). In MF implementations, the MF-APs 111 are entities that provide MulteFire radio services, and may be similar to eNBs 111 in an 3GPP architecture. Each MF-AP 111 includes or provides one or more MF cells.

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 111 to the UEs 101, while UL transmissions from the UEs 101 to RAN nodes 111 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with a half-frame 0 comprising subframes 0-4 and a half-frame 1 comprising subframes 5-9. There is one set of frames in the UL and one set of frames in the DL on a carrier. Uplink frame number i for transmission from the UE 101 starts $T_{TA}=(N_{TA}+N_{TA,offset})T_c$ before the start of the corresponding downlink frame at the UE where $N_{TA,offset}$ is given by 3GPP TS 38.213. For subcarrier spacing configuration μ, slots are numbered $n_s^{\mu} \in \{0, \ldots, N_{slot}^{subframe,\mu}-1\}$ in increasing order within a subframe and $n_{s,f}^{\mu} \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^{\mu}$ in a subframe is aligned in time with the start of OFDM symbol $n_s^{\mu}N_{symb}^{slot}$ in the same subframe. OFDM symbols in a slot can be classified as 'downlink', 'flexible', or 'uplink', where downlink transmissions only occur in 'downlink' or 'flexible' symbols and the UEs 101 only transmit in 'uplink' or 'flexible' symbols.

For each numerology and carrier, a resource grid of $N_{grid,x}^{size,\mu}N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (i.e., uplink or downlink) with the subscript x set to DL for downlink and x set to UL for uplink. There is one resource grid for a given antenna port p, subcarrier spacing configuration μ, and transmission direction (i.e., downlink or uplink).

An RB is defined as $N_{sc}^{RB}=12$ consecutive subcarriers in the frequency domain. Common RBs are numbered from 0 and upwards in the frequency domain for subcarrier spacing configuration μ. The center of subcarrier 0 of common resource block 0 for subcarrier spacing configuration μ coincides with 'point A'. The relation between the common resource block number $n_{CRB}^{\mu}$ in the frequency domain and resource elements (k,l) for subcarrier spacing configuration μ is given by $$n_{CRB}^{\mu} = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration μ are defined within a BWP and numbered from 0 to $N_{BWP,i}^{subframe,\mu}-1$ where i is the number of the BWP. The relation between the physical resource block $n_{PRB}^{\mu}$ in BWPi and the common RB $n_{CRB}^{\mu}$ is given by $n_{CRB}^{\mu}=n_{PRB}^{\mu}+N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration μ is called an RE and is uniquely identified by $(k,l)_{p,\mu}$ where k is the index in the frequency domain and I refers to the symbol position in the time domain relative to some reference point. Resource element $(k,l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in $BWP^i$ on a given carrier. The starting position $N_{BWP,i}^{start,\mu}$ and the number of resource blocks $N_{BWP,i}^{size,\mu}$ in a BWP shall fulfil $N_{grid,x}^{start,\mu} \leq N_{BWP,i}^{start,\mu} < N_{grid,x}^{start,\mu}+N_{grid,x}^{start,\mu}$ and $N_{grid,x}^{start,\mu} < N_{BWP,i}^{start,\mu}+N_{BWP,i}^{size,\mu} \leq N_{grix,x}^{start,\mu}+N_{grid,x}^{size,\mu}$, respectively. Configuration of a BWP is described in clause 12 of 3GPP TS 38.213. The UEs 101 can be configured with up to four BWPs in the DL with a single DL BWP being active at a given time. The UEs 101 are not expected to receive PDSCH, PDCCH, or CSI-RS (except for RRM) outside an active BWP. The UEs 101 can be configured with up to four BWPs in the UL with a single UL BWP being active at a given time. If a UE 101 is configured with a supplementary UL, the UE 101 can be configured with up to four additional BWPs in the supplementary UL with a single supplementary UL BWP being active at a given time. The UEs 101 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB}+i_0+i & \text{if } N_{RB}^{UL} \bmod 2 = 0 \\ 6n_{NB}+i_0+i & \text{if } N_{RB}^{UL} \bmod 2 = 1 \text{ and } n_{NB} < N_{NB}^{UL}/2 \\ 6n_{NB}+i_0+i+1 & \text{if } N_{RB}^{UL} \bmod 2 = 1 \text{ and } n_{NB} \geq N_{NB}^{UL}/2 \end{cases},$$

$$i = 0, 1, \ldots, 5$$

$$\text{where } i_0 = \left\lfloor \frac{N_{RB}^{UL}}{2} \right\rfloor - \frac{6N_{NB}^{UL}}{2}.$$

If $N_{NB}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+i$ where i=0, 1, . . . , 3. If $N_{NB}^{UL}<4$, then $N_{WB}^{UL}=1$ and the single wideband is composed of the $N_{NB}^{UL}$ non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 710 of FIG. 7) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 101. Typically, DL scheduling (assigning control and shared channel resource blocks to the UE 101 within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 101 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 101 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 101 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs 101; switching an active BWP for a UE 101; and initiating a random access procedure.

In NR implementations, the UEs 101 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 101 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 111 may be configured to communicate with one another via interface 112. In embodiments where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 100 is an MF system (e.g., when CN 120 is an NHCN 120), the interface 112 may be an X2 interface 112. The X2 interface may be defined between two or more RAN nodes 111 (e.g., two or more MF-APs and the like) that connect to NHCN 120, and/or between two MF-APs connecting to NHCN 120. In these embodiments, the X2 interface may operate in a same or similar manner as discussed previously.

In embodiments where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, CN 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a UPF (e.g., the N3 and/or N9 reference points), and the S1 control plane (NG-C) interface 115, which is a signaling interface between the RAN nodes 111 and AMFs 120 (e.g., the N2 reference point). Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an EPC). Where CN 120 is an EPC (referred to as "EPC 120" or the like), the RAN 110 may be connected with the CN 120 via an S1 interface 113. In embodiments, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

In embodiments where the CN 120 is an MF NHCN 120, the one or more network elements 122 may include or operate one or more NH-MMEs, local AAA proxies, NH-GWs, and/or other like MF NHCN elements. The NH-MME provides similar functionality as an MME in EPC 120. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 113 and is similar to the TWAG in interactions with the PLMN PDN-GWs over the S2a interface. In some embodiments, the MF APs 111 may connect with the EPC 120 discussed previously. Additionally, the RAN 110 (referred to as an "MF RAN 110" or the like) may be connected with the NHCN 120 via an S1 interface 113. In these embodiments, the S1 interface 113 may be split into two parts, the S1-U interface 114 that carries traffic data between the RAN nodes 111 (e.g., the "MF-APs 111") and the NH-GW, and the S1-MME-N interface 115, which is a signaling interface between the RAN nodes 111 and NH-MMEs. The S1-U interface 114 and the S1-MME-N interface 115 have the same or similar functionality as the S1-U interface 114 and the S1-MME interface 115 of the EPC 120 discussed herein.

Figure 2:
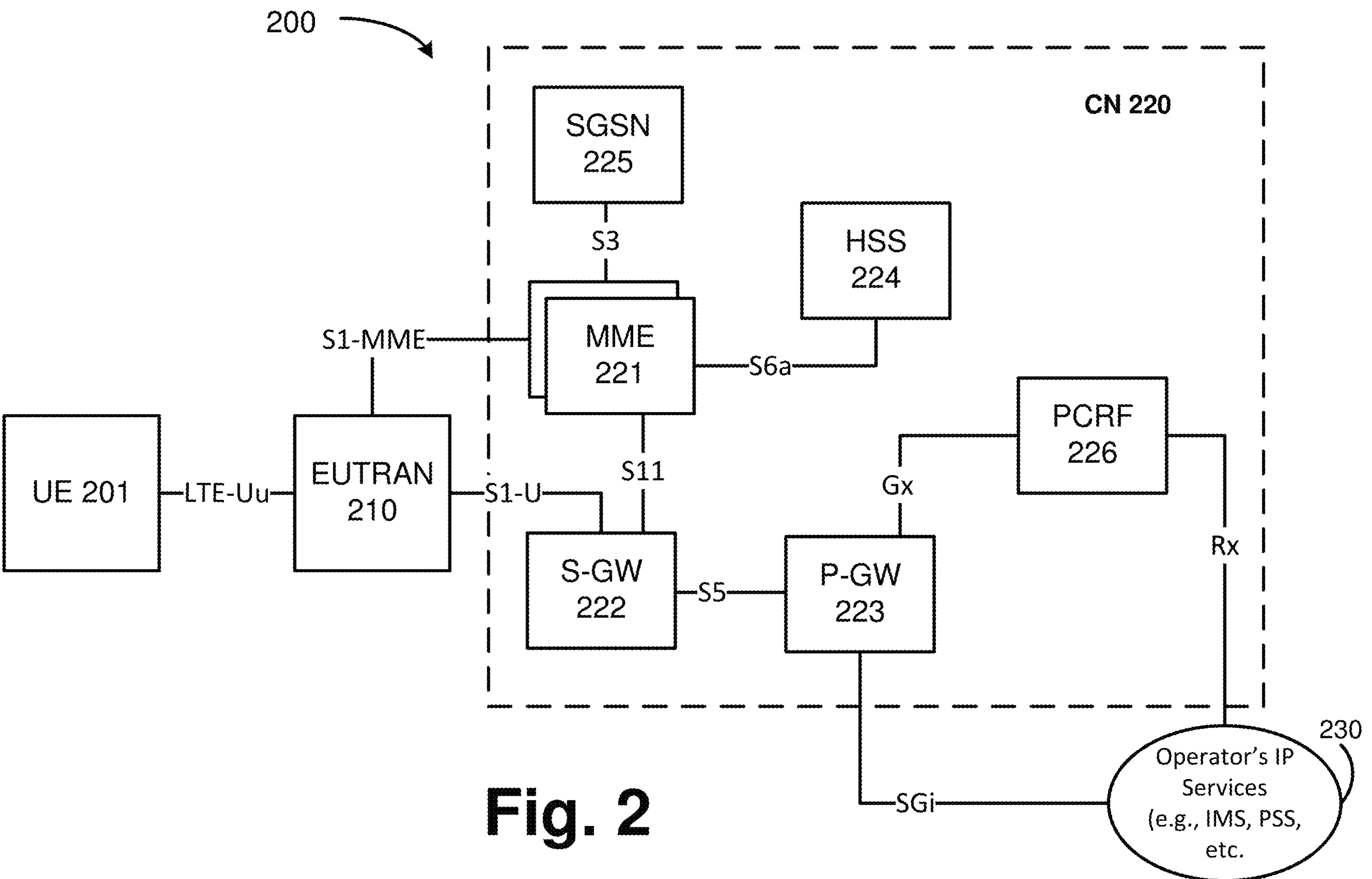
FIG. 2 illustrates an example architecture of a system including a first core network, in accordance with various embodiments.

FIG. 2 illustrates an example architecture of a system 200 including a first CN 220, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HSS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In embodiments, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
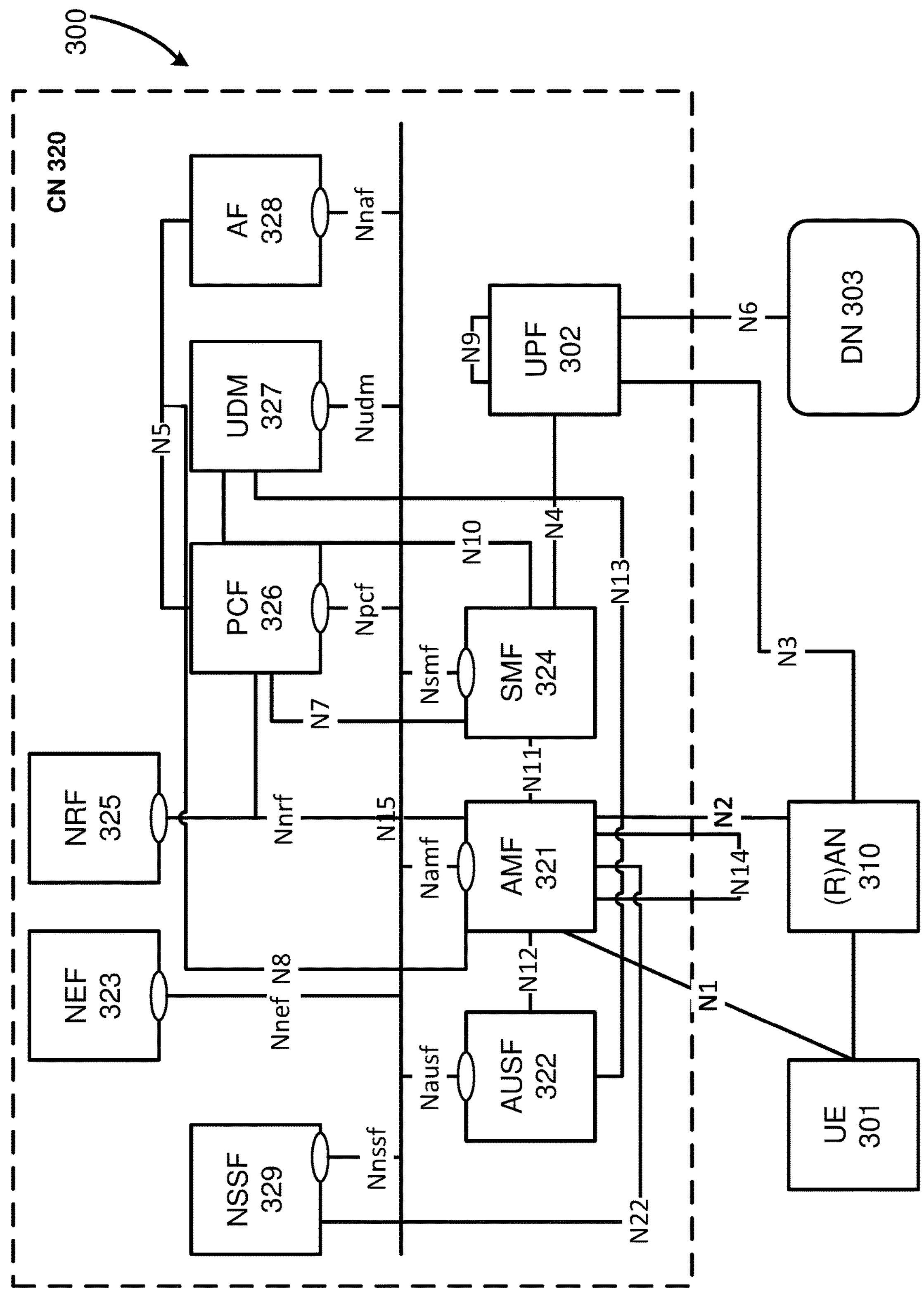
FIG. 3 illustrates an architecture of a system including a second core network in accordance with various embodiments.

FIG. 3 illustrates an architecture of a system 300 including a second CN 320 in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The 5GC 320 may include an AUSF 322; an AMF 321; a SMF 324; a NEF 323; a PCF 326; a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore, AMF 321 may be a termination point of a RAN CP interface, which may include or be an N2 reference point between the (R)AN 310 and the AMF 321; and the AMF 321 may be a termination point of NAS (N1) signaling, and perform NAS ciphering and integrity protection.

AMF 321 may also support NAS signaling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signaling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services. RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode, or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 321 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
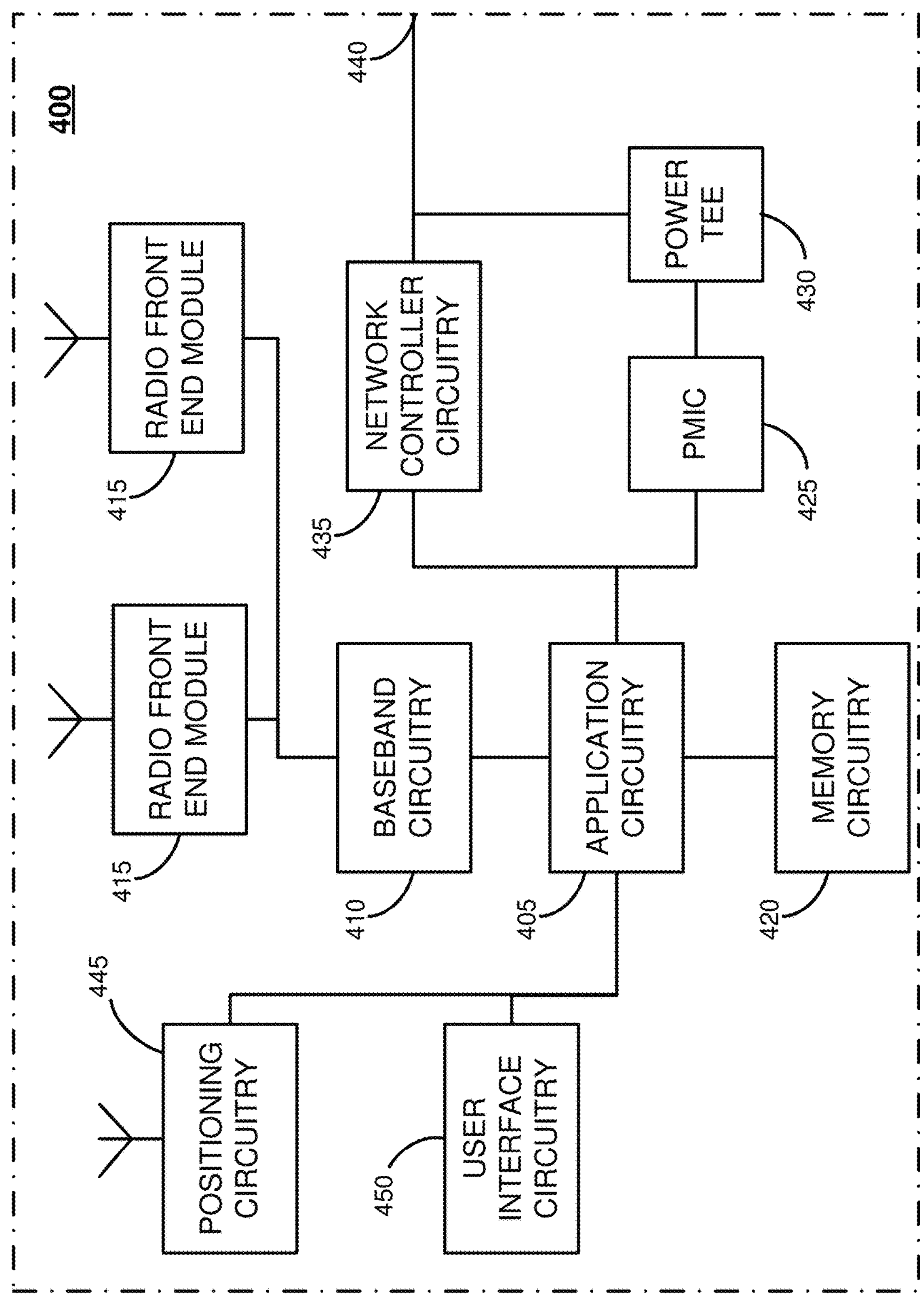
FIG. 4 illustrates an example of infrastructure equipment 400 in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 5:
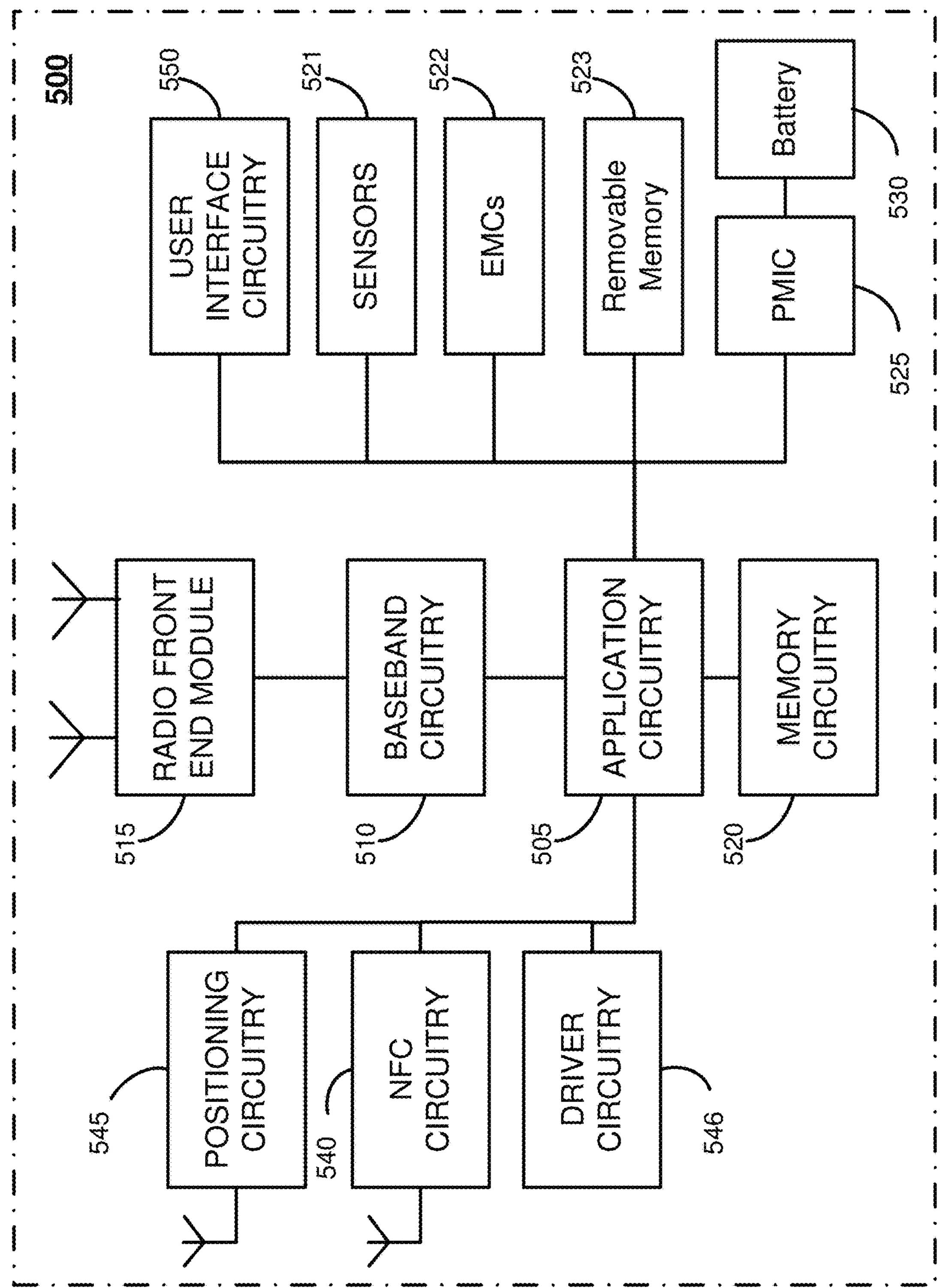
FIG. 5 illustrates an example of a platform or device in accordance with various embodiments.

FIG. 5 illustrates an example of a platform 500 (or "device 500") in accordance with various embodiments. In embodiments, the computer platform 500 may be suitable for use as UEs 101, 201, 301, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 405 may comprise, or may be, a special-purpose processor/controller to operate according to the various embodiments herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports, or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signaling to other components of the platform 500 to indicate a current state of the EMCs 522. Examples of the EMCs 522 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some embodiments, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (UP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 6:
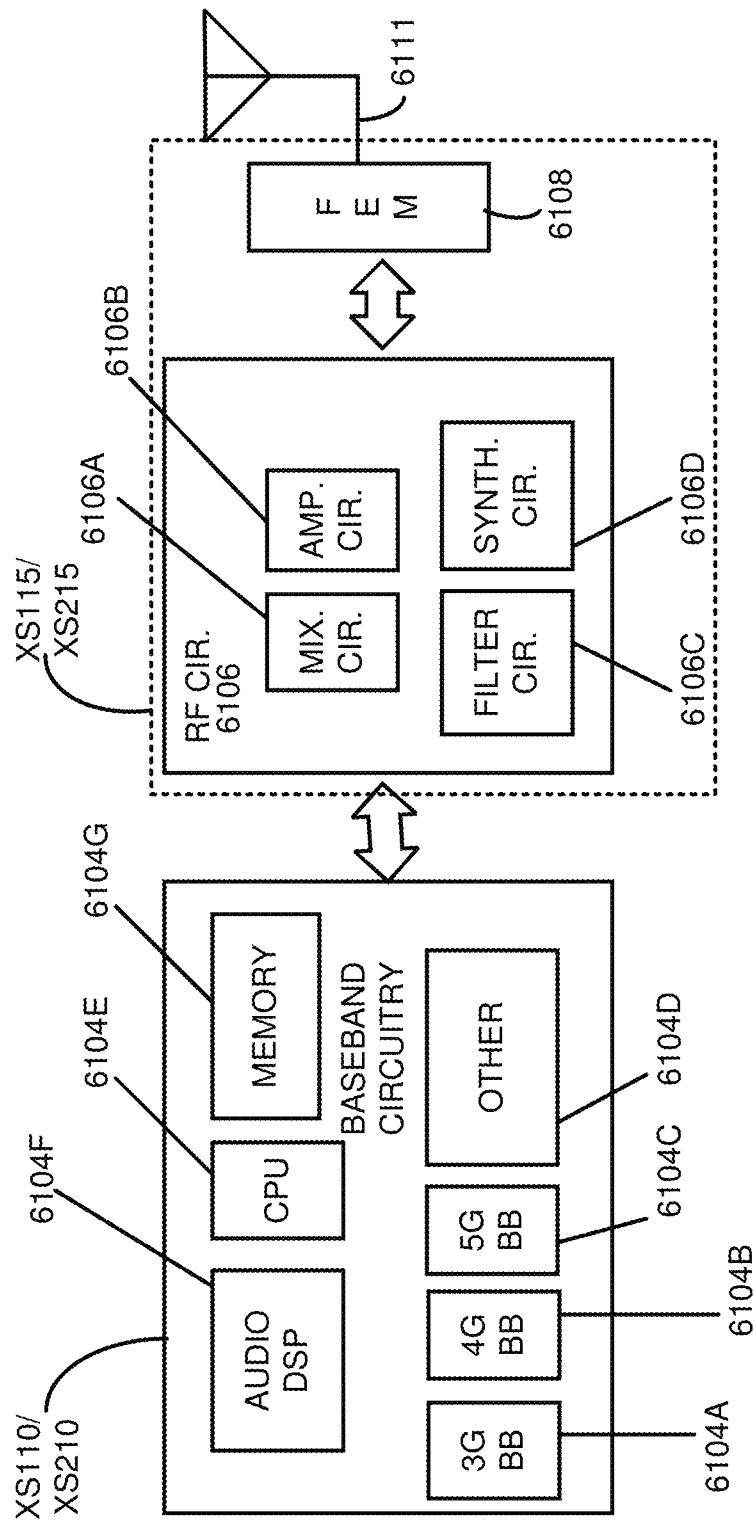
FIG. 6 illustrates example components of baseband circuitry and radio front end modules (RFEM) in accordance with various embodiments.

FIG. 6 illustrates example components of baseband circuitry 6110 and radio front end modules (RFEM) 6115 in accordance with various embodiments. The baseband circuitry 6110 corresponds to the baseband circuitry 410 and 510 of FIGS. 4 and 5, respectively. The RFEM 6115 corresponds to the RFEM 415 and 515 of FIGS. 4 and 5, respectively. As shown, the RFEMs 6115 may include Radio Frequency (RF) circuitry 6106, front-end module (FEM) circuitry 6108, antenna array 6111 coupled together at least as shown.

The baseband circuitry 6110 includes circuitry and/or control logic configured to carry out various radio/network protocol and radio control functions that enable communication with one or more radio networks via the RF circuitry 6106. The radio control functions may include, but are not limited to, signal modulation/demodulation, encoding/decoding, radio frequency shifting, etc. In some embodiments, modulation/demodulation circuitry of the baseband circuitry 6110 may include Fast-Fourier Transform (FFT), precoding, or constellation mapping/demapping functionality. In some embodiments, encoding/decoding circuitry of the baseband circuitry 6110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 6110 is configured to process baseband signals received from a receive signal path of the RF circuitry 6106 and to generate baseband signals for a transmit signal path of the RF circuitry 6106. The baseband circuitry 6110 is configured to interface with application circuitry 405/505 (see FIGS. 4 and 5) for generation and processing of the baseband signals and for controlling operations of the RF circuitry 6106. The baseband circuitry 6110 may handle various radio control functions.

The aforementioned circuitry and/or control logic of the baseband circuitry 6110 may include one or more single or multi-core processors. For example, the one or more processors may include a 3G baseband processor 6104A, a 4G/LTE baseband processor 6104B, a 5G/NR baseband processor 6104C, or some other baseband processor(s) 6104D for other existing generations, generations in development or to be developed in the future (e.g., sixth generation (6G), etc.). In other embodiments, some or all of the functionality of baseband processors 6104A-D may be included in modules stored in the memory 6104G and executed via a Central Processing Unit (CPU) 6104E. In other embodiments, some or all of the functionality of baseband processors 6104A-D may be provided as hardware accelerators (e.g., FPGAs, ASICs, etc.) loaded with the appropriate bit streams or logic blocks stored in respective memory cells. In various embodiments, the memory 6104G may store program code of a real-time OS (RTOS), which when executed by the CPU 6104E (or other baseband processor), is to cause the CPU 6104E (or other baseband processor) to manage resources of the baseband circuitry 6110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 6110 includes one or more audio digital signal processor(s) (DSP) 6104F. The audio DSP(s) 6104F include elements for compression/decompression and echo cancellation and may include other suitable processing elements in other embodiments.

In some embodiments, each of the processors 6104A-6104E include respective memory interfaces to send/receive data to/from the memory 6104G. The baseband circuitry 6110 may further include one or more interfaces to communicatively couple to other circuitries/devices, such as an interface to send/receive data to/from memory external to the baseband circuitry 6110; an application circuitry interface to send/receive data to/from the application circuitry 405/505 of FIGS. 4-5); an RF circuitry interface to send/receive data to/from RF circuitry 6106 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 6110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 6110 may include protocol processing circuitry with one or more instances of control circuitry (not shown) to provide control functions for the digital baseband circuitry and/or radio frequency circuitry (e.g., the radio front end modules 6115).

Although not shown by FIG. 6, in some embodiments, the baseband circuitry 6110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 6110 and/or RF circuitry 6106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 6110 and/or RF circuitry 6106 are part of a Wi-Fi communication system. In the second example, the protocol processing circuitry would operate Wi-Fi MAC and logical link control (LLC) functions. The protocol processing circuitry may include one or more memory structures (e.g., 6104G) to store program code and data for operating the protocol functions, as well as one or more processing cores to execute the program code and perform various operations using the data. The baseband circuitry 6110 may also support radio communications for more than one wireless protocol.

The various hardware elements of the baseband circuitry 6110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 6110 may be suitably combined in a single chip or chipset, or disposed on a same circuit board. In another example, some or all of the constituent components of the baseband circuitry 6110 and RF circuitry 6106 may be implemented together such as, for example, a system on a chip (SoC) or System-in-Package (SiP). In another example, some or all of the constituent components of the baseband circuitry 6110 may be implemented as a separate SoC that is communicatively coupled with and RF circuitry 6106 (or multiple instances of RF circuitry 6106). In yet another example, some or all of the constituent components of the baseband circuitry 6110 and the application circuitry 405/505 may be implemented together as individual SoCs mounted to a same circuit board (e.g., a "multi-chip package").

In some embodiments, the baseband circuitry 6110 may provide for communication compatible with one or more radio technologies. For example, in some embodiments, the baseband circuitry 6110 may support communication with an E-UTRAN or other WMAN, a WLAN, a WPAN. Embodiments in which the baseband circuitry 6110 is configured to support radio communications of more than one wireless protocol may be referred to as multi-mode baseband circuitry.

RF circuitry 6106 may enable communication with wireless networks using modulated electromagnetic radiation through a non-solid medium. In various embodiments, the RF circuitry 6106 may include switches, filters, amplifiers, etc. to facilitate the communication with the wireless network. RF circuitry 6106 may include a receive signal path, which may include circuitry to down-convert RF signals received from the FEM circuitry 6108 and provide baseband signals to the baseband circuitry 6110. RF circuitry 6106 may also include a transmit signal path, which may include circuitry to up-convert baseband signals provided by the baseband circuitry 6110 and provide RF output signals to the FEM circuitry 6108 for transmission.

In some embodiments, the receive signal path of the RF circuitry 6106 may include mixer circuitry 6106*a*, amplifier circuitry 6106*b* and filter circuitry 6106*c*. In some embodiments, the transmit signal path of the RF circuitry 6106 may include filter circuitry 6106*c* and mixer circuitry 6106*a*. RF circuitry 6106 may also include synthesizer circuitry 6106*d* for synthesizing a frequency for use by the mixer circuitry 6106*a* of the receive signal path and the transmit signal path. In some embodiments, the mixer circuitry 6106*a* of the receive signal path may be configured to down-convert RF signals received from the FEM circuitry 6108 based on the synthesized frequency provided by synthesizer circuitry 6106*d*. The amplifier circuitry 6106*b* may be configured to amplify the down-converted signals and the filter circuitry 6106*c* may be a low-pass filter (LPF) or band-pass filter (BPF) configured to remove unwanted signals from the down-converted signals to generate output baseband signals. Output baseband signals may be provided to the baseband circuitry 6110 for further processing. In some embodiments, the output baseband signals may be zero-frequency baseband signals, although this is not a requirement. In some embodiments, mixer circuitry 6106*a* of the receive signal path may comprise passive mixers, although the scope of the embodiments is not limited in this respect.

In some embodiments, the mixer circuitry 6106*a* of the transmit signal path may be configured to up-convert input baseband signals based on the synthesized frequency provided by the synthesizer circuitry 6106*d* to generate RF output signals for the FEM circuitry 6108. The baseband signals may be provided by the baseband circuitry 6110 and may be filtered by filter circuitry 6106*c*.

In some embodiments, the mixer circuitry 6106*a* of the receive signal path and the mixer circuitry 6106*a* of the transmit signal path may include two or more mixers and may be arranged for quadrature downconversion and upconversion, respectively. In some embodiments, the mixer circuitry 6106*a* of the receive signal path and the mixer circuitry 6106*a* of the transmit signal path may include two or more mixers and may be arranged for image rejection (e.g., Hartley image rejection). In some embodiments, the mixer circuitry 6106*a* of the receive signal path and the mixer circuitry 6106*a* of the transmit signal path may be arranged for direct downconversion and direct upconversion, respectively. In some embodiments, the mixer circuitry 6106*a* of the receive signal path and the mixer circuitry 6106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 6106 may include analog-to-digital converter (ADC) and digital-to-analog converter (DAC) circuitry and the baseband circuitry 6110 may include a digital baseband interface to communicate with the RF circuitry 6106.

In some dual-mode embodiments, a separate radio IC circuitry may be provided for processing signals for each spectrum, although the scope of the embodiments is not limited in this respect.

In some embodiments, the synthesizer circuitry 6106*d* may be a fractional-N synthesizer or a fractional N/N+1 synthesizer, although the scope of the embodiments is not limited in this respect as other types of frequency synthesizers may be suitable. For example, synthesizer circuitry 6106*d* may be a delta-sigma synthesizer, a frequency multiplier, or a synthesizer comprising a phase-locked loop with a frequency divider.

The synthesizer circuitry 6106*d* may be configured to synthesize an output frequency for use by the mixer circuitry 6106*a* of the RF circuitry 6106 based on a frequency input and a divider control input. In some embodiments, the synthesizer circuitry 6106*d* may be a fractional N/N+1 synthesizer.

In some embodiments, frequency input may be provided by a voltage controlled oscillator (VCO), although that is not a requirement. Divider control input may be provided by either the baseband circuitry 6110 or the application circuitry 405/505 depending on the desired output frequency. In some embodiments, a divider control input (e.g., N) may be determined from a look-up table based on a channel indicated by the application circuitry 405/505.

Synthesizer circuitry 6106*d* of the RF circuitry 6106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 6106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 6106 may include an IQ/polar converter.

FEM circuitry 6108 may include a receive signal path, which may include circuitry configured to operate on RF signals received from antenna array 6111, amplify the received signals and provide the amplified versions of the received signals to the RF circuitry 6106 for further processing. FEM circuitry 6108 may also include a transmit signal path, which may include circuitry configured to amplify signals for transmission provided by the RF circuitry 6106 for transmission by one or more of antenna elements of antenna array 6111. In various embodiments, the amplification through the transmit or receive signal paths may be done solely in the RF circuitry 6106, solely in the FEM circuitry 6108, or in both the RF circuitry 6106 and the FEM circuitry 6108.

In some embodiments, the FEM circuitry 6108 may include a TX/RX switch to switch between transmit mode and receive mode operation. The FEM circuitry 6108 may include a receive signal path and a transmit signal path. The receive signal path of the FEM circuitry 6108 may include an LNA to amplify received RF signals and provide the amplified received RF signals as an output (e.g., to the RF circuitry 6106). The transmit signal path of the FEM circuitry 6108 may include a power amplifier (PA) to amplify input RF signals (e.g., provided by RF circuitry 6106), and one or more filters to generate RF signals for subsequent transmission by one or more antenna elements of the antenna array 6111.

The antenna array 6111 comprises one or more antenna elements, each of which is configured convert electrical signals into radio waves to travel through the air and to convert received radio waves into electrical signals. For example, digital baseband signals provided by the baseband circuitry 6110 is converted into analog RF signals (e.g., modulated waveform) that will be amplified and transmitted via the antenna elements of the antenna array 6111 including one or more antenna elements (not shown). The antenna elements may be omnidirectional, direction, or a combination thereof. The antenna elements may be formed in a multitude of arranges as are known and/or discussed herein. The antenna array 6111 may comprise microstrip antennas or printed antennas that are fabricated on the surface of one or more printed circuit boards. The antenna array 6111 may be formed in as a patch of metal foil (e.g., a patch antenna) in a variety of shapes, and may be coupled with the RF circuitry 6106 and/or FEM circuitry 6108 using metal transmission lines or the like.

Processors of the application circuitry 405/505 and processors of the baseband circuitry 6110 may be used to execute elements of one or more instances of a protocol stack. For example, processors of the baseband circuitry 6110, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
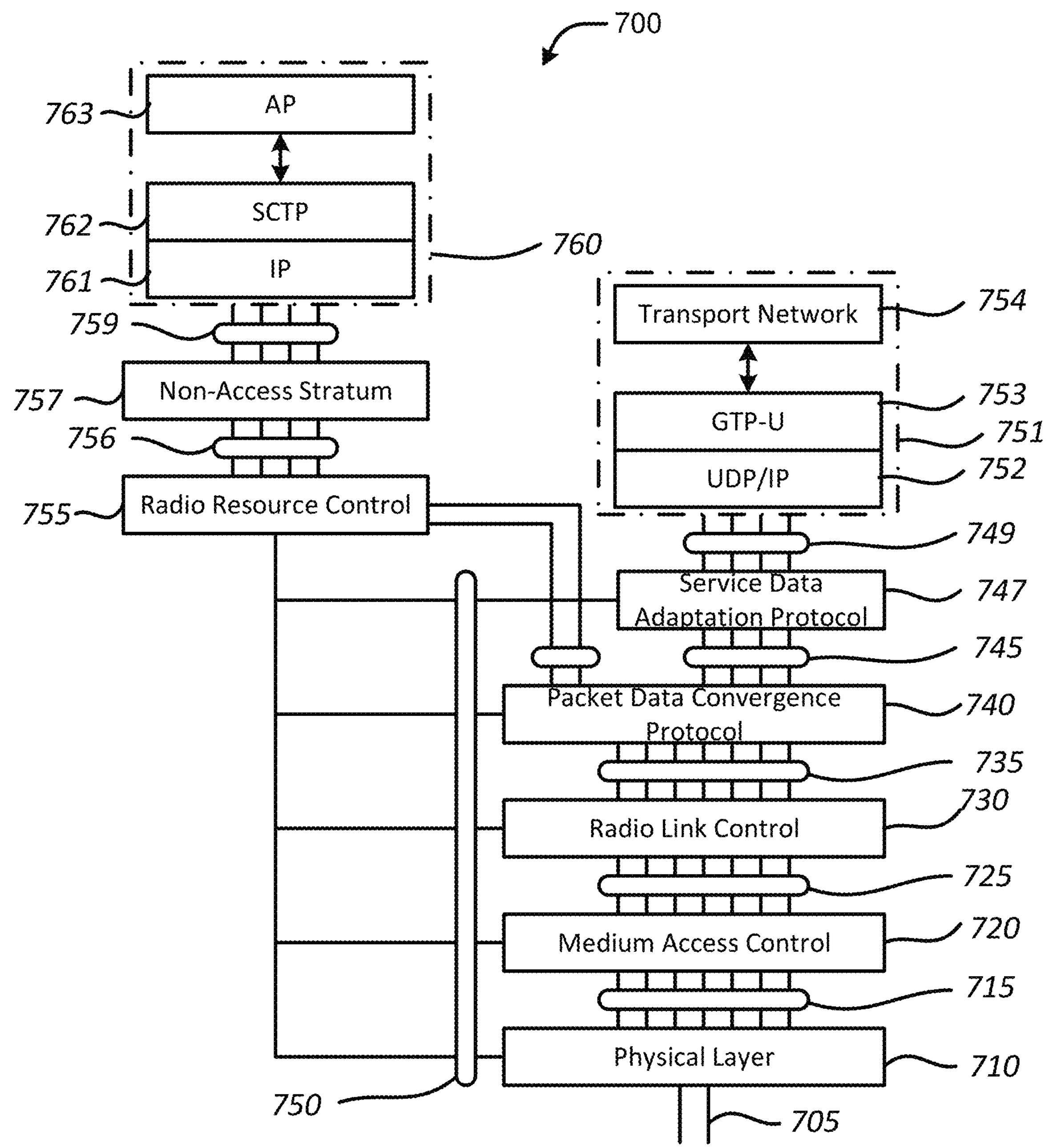
FIG. 7 illustrates various protocol functions that may be implemented in a wireless communication device according to various embodiments.

FIG. 7 illustrates various protocol functions that may be implemented in a wireless communication device according to various embodiments. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 may be applicable to other wireless communication network systems as well.

The protocol layers of arrangement 700 may include one or more of PHY 710, MAC 720, RLC 730, PDCP 740, SDAP 747, RRC 755, and NAS layer 757, in addition to other higher layer functions not illustrated. The protocol layers may include one or more service access points (e.g., items 759, 756, 750, 749, 745, 735, 725, and 715 in FIG. 7) that may provide communication between two or more protocol layers.

The PHY 710 may transmit and receive physical layer signals 705 that may be received from or transmitted to one or more other communication devices. The physical layer signals 705 may comprise one or more physical channels, such as those discussed herein. The PHY 710 may further perform link adaptation or adaptive modulation and coding (AMC), power control, cell search (e.g., for initial synchronization and handover purposes), and other measurements used by higher layers, such as the RRC 755. The PHY 710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 710 may process requests from and provide indications to an instance of MAC 720 via one or more PHY-SAP 715. According to some embodiments, requests and indications communicated via PHY-SAP 715 may comprise one or more transport channels.

Instance(s) of MAC 720 may process requests from, and provide indications to, an instance of RLC 730 via one or more MAC-SAPS 725. These requests and indications communicated via the MAC-SAP 725 may comprise one or more logical channels. The MAC 720 may perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

Instance(s) of RLC 730 may process requests from and provide indications to an instance of PDCP 740 via one or more radio link control service access points (RLC-SAP) 735. These requests and indications communicated via RLC-SAP 735 may comprise one or more RLC channels. The RLC 730 may operate in a plurality of modes of operation, including: Transparent Mode™, Unacknowledged Mode (UM), and Acknowledged Mode (AM). The RLC 730 may execute transfer of upper layer protocol data units (PDUs), error correction through automatic repeat request (ARQ) for AM data transfers, and concatenation, segmentation and reassembly of RLC SDUs for UM and AM data transfers. The RLC 730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 may process requests from and provide indications to instance(s) of RRC 755 and/or instance(s) of SDAP 747 via one or more packet data convergence protocol service access points (PDCP-SAP) 745. These requests and indications communicated via PDCP-SAP 745 may comprise one or more radio bearers. The PDCP 740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 may process requests from and provide indications to one or more higher layer protocol entities via one or more SDAP-SAP 749. These requests and indications communicated via SDAP-SAP 749 may comprise one or more QoS flows. The SDAP 747 may map QoS flows to DRBs, and vice versa, and may also mark QFIs in DL and UL packets. A single SDAP entity 747 may be configured for an individual PDU session. In the UL direction, the NG-RAN 110 may control the mapping of QoS Flows to DRB(s) in two different ways, reflective mapping or explicit mapping. For reflective mapping, the SDAP 747 of a UE 101 may monitor the QFIs of the DL packets for each DRB, and may apply the same mapping for packets flowing in the UL direction. For a DRB, the SDAP 747 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 755 configuring the SDAP 747 with an explicit QoS flow to DRB mapping rule, which may be stored and followed by the SDAP 747. In embodiments, the SDAP 747 may only be used in NR implementations and may not be used in LTE implementations.

The RRC 755 may configure, via one or more management service access points (M-SAP), aspects of one or more protocol layers, which may include one or more instances of PHY 710, MAC 720, RLC 730, PDCP 740 and SDAP 747. In embodiments, an instance of RRC 755 may process requests from and provide indications to one or more NAS entities 757 via one or more RRC-SAPS 756. The main services and functions of the RRC 755 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 757 may form the highest stratum of the control plane between the UE 101 and the AMF 321. The NAS 757 may support the mobility of the UEs 101 and the session management procedures to establish and maintain IP connectivity between the UE 101 and a P-GW in LTE systems.

According to various embodiments, one or more protocol entities of arrangement 700 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-CU of the gNB 111 may host the RRC 755, SDAP 747, and PDCP 740 of the gNB that controls the operation of one or more gNB-DUs, and the gNB-DUs of the gNB 111 may each host the RLC 730, MAC 720, and PHY 710 of the gNB 111.

In a first example, a control plane protocol stack may comprise, in order from highest layer to lowest layer, NAS 757, RRC 755, PDCP 740, RLC 730, MAC 720, and PHY 710. In this example, upper layers 760 may be built on top of the NAS 757, which includes an IP layer 761, an SCTP 762, and an application layer signaling protocol (AP) 763.

In NR implementations, the AP 763 may be an NG application protocol layer (NGAP or NG-AP) 763 for the NG interface 113 defined between the NG-RAN node 111 and the AMF 321, or the AP 763 may be an Xn application protocol layer (XnAP or Xn-AP) 763 for the Xn interface 112 that is defined between two or more RAN nodes 111.

The NG-AP 763 may support the functions of the NG interface 113 and may comprise Elementary Procedures (EPs). An NG-AP EP may be a unit of interaction between the NG-RAN node 111 and the AMF 321. The NG-AP 763 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 763 may be an S1 Application Protocol layer (S1-AP) 763 for the S1 interface 113 defined between an E-UTRAN node 111 and an MME, or the AP 763 may be an X2 application protocol layer (X2AP or X2-AP) 763 for the X2 interface 112 that is defined between two or more E-UTRAN nodes 111.

The S1 Application Protocol layer (S1-AP) 763 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 762 may provide guaranteed delivery of application layer messages (e.g., NGAP or XnAP messages in NR implementations, or S1-AP or X2AP messages in LTE implementations). The SCTP 762 may ensure reliable delivery of signaling messages between the RAN node 111 and the AMF 321/MME 221 based, in part, on the IP protocol, supported by the IP 761. The Internet Protocol layer (IP) 761 may be used to perform packet addressing and routing functionality. In some implementations the IP layer 761 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 747, PDCP 740, RLC 730, MAC 720, and PHY 710. The user plane protocol stack may be used for communication between the UE 101, the RAN node 111, and UPF 302 in NR implementations or an S-GW 222 and P-GW 223 in LTE implementations. In this example, upper layers 751 may be built on top of the SDAP 747, and may include a user datagram protocol (UDP) and IP security layer (UDP/IP) 752, a General Packet Radio Service (GPRS) Tunneling Protocol for the user plane layer (GTP-U) 753, and a User Plane PDU layer (UP PDU) 763.

The transport network layer 754 (also referred to as a "transport layer") may be built on IP transport, and the GTP-U 753 may be used on top of the UDP/IP layer 752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 753 may be used for carrying user data within the GPRS core network and between the radio access network and the core network. The user data transported can be packets in any of IPv4, IPv6, or PPP formats, for example. The UDP/IP 752 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 710), an L2 layer (e.g., MAC 720, RLC 730, PDCP 740, and/or SDAP 747), the UDP/IP layer 752, and the GTP-U 753. The S-GW 222 and the P-GW 223 may utilize an 55/58a interface to exchange user plane data via a protocol stack comprising an L1 layer, an L2 layer, the UDP/IP layer 752, and the GTP-U 753. As discussed previously, NAS protocols may support the mobility of the UE 101 and the session management procedures to establish and maintain IP connectivity between the UE 101 and the P-GW 223.

Moreover, although not shown by FIG. 7, an application layer may be present above the AP 763 and/or the transport network layer 754. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 6110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 8:
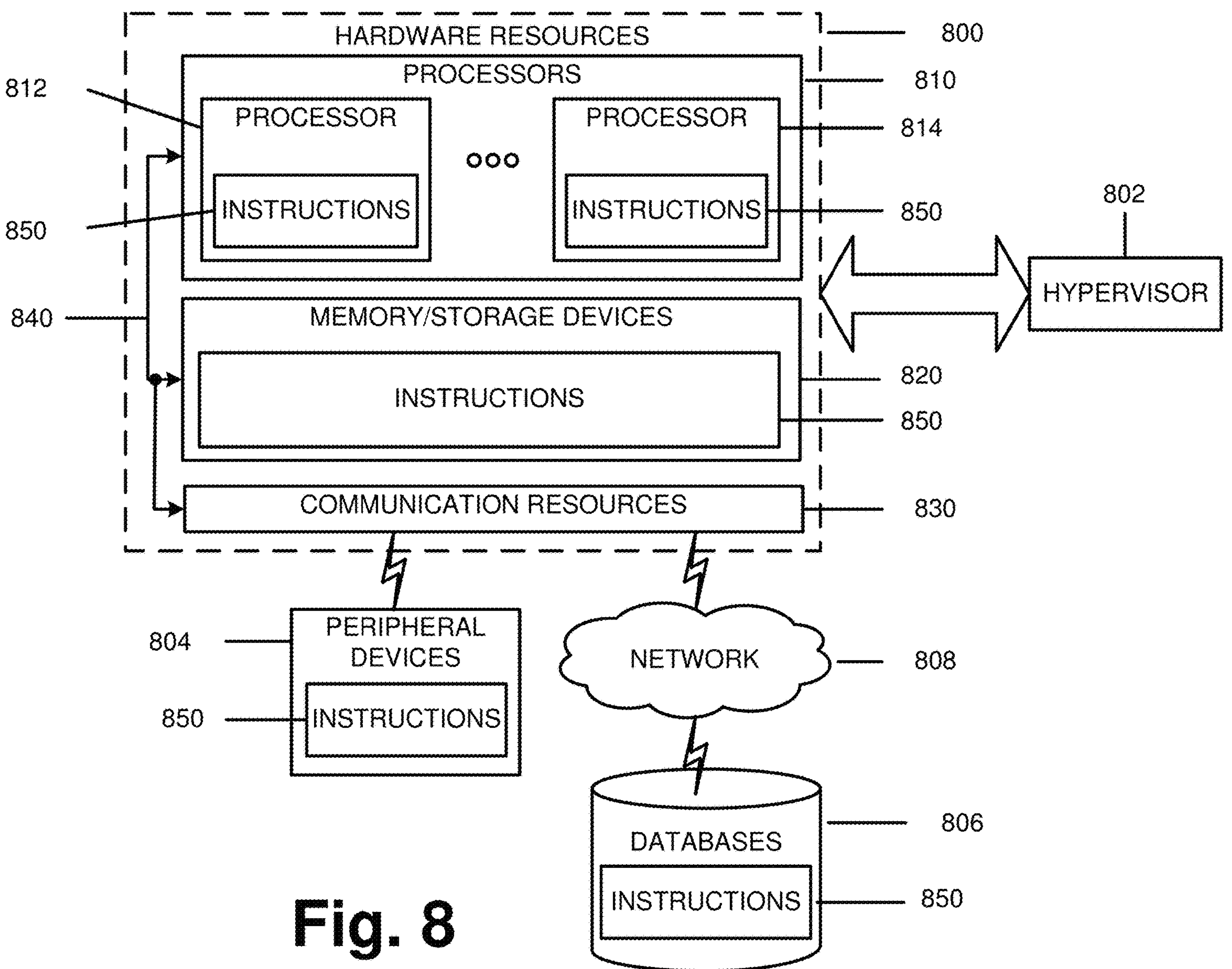
FIG. 8 illustrates a block diagram showing components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding Figures may be configured to operate in accordance with one or more of the examples set forth below. For another example, circuitry associated with a UE, base station, network element, etc. as described above in connection with one or more of the preceding Figures may be configured to operate in accordance with one or more of the examples set forth below in the example section.

The components of FIGS. 1-8 may be used in any of the embodiments described herein.

Figure 9:
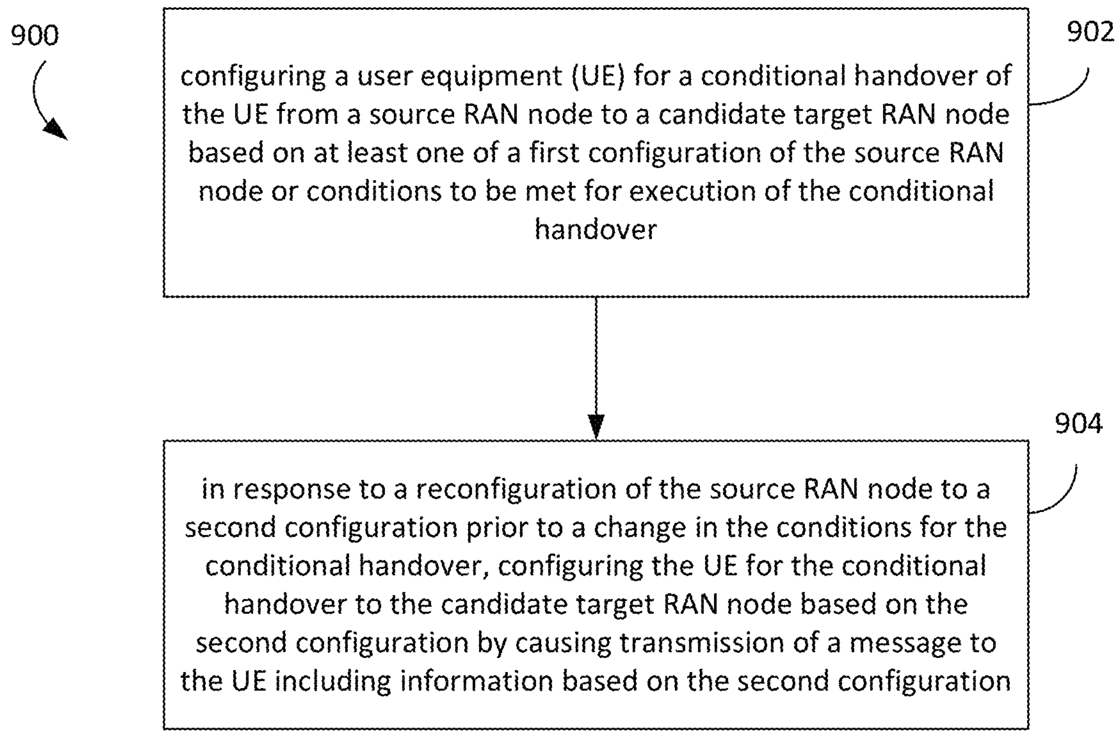
FIG. 9 illustrates a flow according to one method embodiment.
Figure 10:
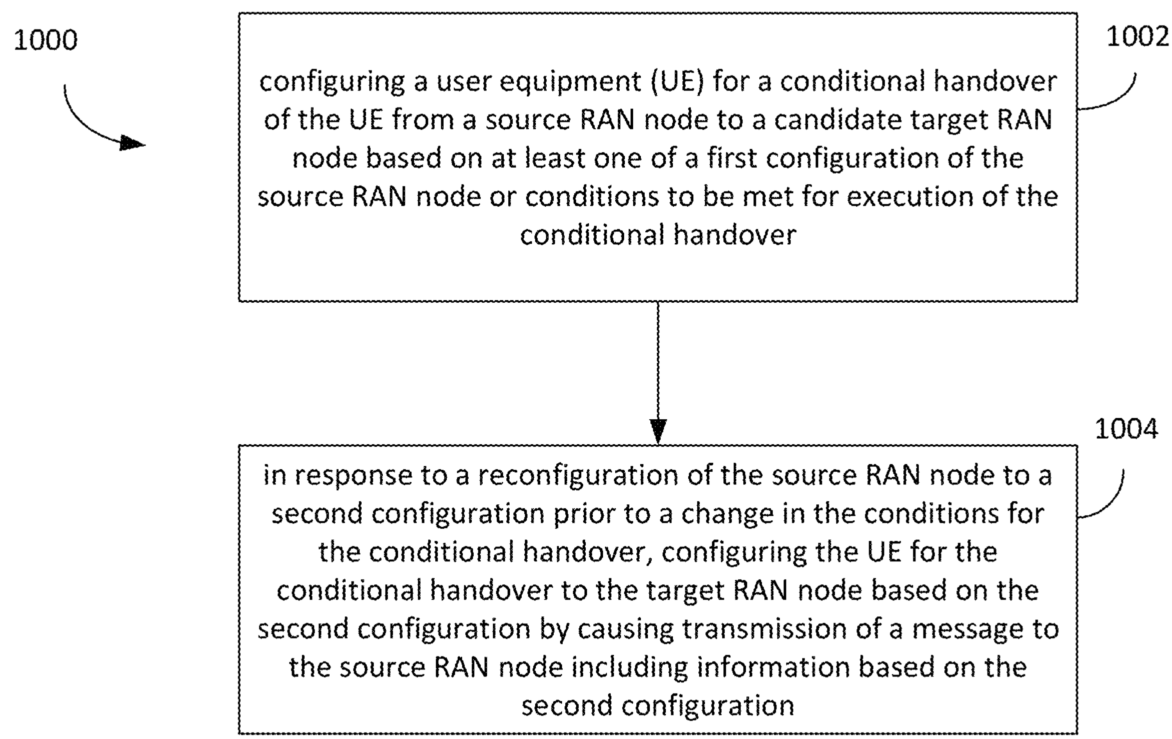
FIG. 10 illustrates a flow according to another method embodiment.

FIGS. 9 and 10 show respective flows for a first and second method according to a first and second embodiment.

FIG. 9 shows a flow 900 for a method to be performed at a source Radio Access Network (RAN) node according to some embodiments. At operation 902, the flow includes configuring a user equipment (UE) for a conditional handover of the UE from the source RAN node to a candidate target RAN node based on at least one of a first configuration of the source RAN node or conditions to be met for execution of the conditional handover. At operation 904, the flow includes in response to a reconfiguration of the source RAN node to a second, configuring the UE for the conditional handover to the candidate target RAN node based on the second configuration by causing transmission of a message to the UE including information based on the second configuration.

FIG. 10 shows a flow 1000 for a method to be performed at a candidate target RAN node according to some embodiments. At operation 1002, the flow includes configuring a user equipment (UE) for a conditional handover of the UE from a source RAN node to the target RAN node based on at least one of a first configuration of the source RAN node or conditions to be met for execution of the conditional handover. At operation 1004, the flow includes in response to a reconfiguration of the source RAN node to a second configuration, configuring the UE for the conditional handover to the target RAN node based on the second configuration by causing transmission of a message to the source RAN node including information based on the second configuration.

In some embodiments, the electronic device(s), network(s), system(s), chip(s) or component(s), or portions or implementations thereof, of FIGS. 1-9, or some other FIG. herein, may be configured to perform one or more processes, techniques, or methods as described herein, or portions thereof. One such process is depicted in FIG. 9 or 10.

For one or more embodiments, at least one of the components set forth in one or more of the preceding Figures may be configured to perform one or more operations, techniques, processes, and/or methods as set forth in the example section below. For example, the baseband circuitry as described above in connection with one or more of the preceding Figures may be configured to operate in accordance with one or more of the examples set forth below. For another example, circuitry associated with a UE, base station, network element, etc. as described above in connection with one or more of the preceding Figures may be configured to operate in accordance with one or more of the examples set forth below in the example section.

EXAMPLES

Example 1 includes an apparatus of a source Radio Access Network (RAN) node, The device comprising: a Radio Frequency (RF) circuitry interface to send and receive messages to and from a RF circuitry; and one or more processors coupled to the RF circuitry interface, the one or more processors to: configure a user equipment (UE) for a conditional handover of the UE from the source RAN node to a candidate target RAN node based on at least one of a first configuration of the source RAN node or conditions to be met for execution of the conditional handover; and in response to a reconfiguration of the source RAN node to a second configuration, configure the UE for the conditional handover to the candidate target RAN node based on the second configuration by causing transmission of a message to the UE including information based on the second configuration by way of the RF circuitry interface.

Example 2 includes the subject matter of Example 1, and optionally, wherein the one or more processor are to configure the UE based on the first configuration by causing transmission of a first handover request message to the candidate target RAN node including information on at least one of the first configuration of the source RAN node or a condition for the conditional handover of the UE from the source RAN node to the candidate target RAN node; processing a first handover request acknowledge message from the candidate target RAN node in response to the first handover request message, the handover request acknowledge message including a conditional handover command based on the first configuration; and causing transmission of a message to the UE based on the conditional handover command to configure the UE to execute the conditional handover to the candidate target RAN node based on the first configuration.

Example 3 includes the subject matter of Example 2, and optionally, wherein the one or more processor are to configure the UE based on the second configuration by: causing transmission of a second handover request message to the candidate target RAN node including information on a second configuration of the source RAN node; processing a second handover request acknowledge message from the candidate target RAN node in response to the second handover request message, the second handover request acknowledge message including an updated conditional handover command based on the second configuration; and causing transmission of a message to the UE based on the second conditional handover command to configure the UE to execute the conditional handover to the candidate target RAN node based on the second configuration.

Example 4 includes the subject matter of Example 3, and optionally, wherein the second handover request message comprises: a radio resource control (RRC) context container including the information on the second configuration of the source RAN node; and an instruction to update the conditional handover command.

Example 5 includes the subject matter of Example 4, and optionally, wherein the instruction to update includes an enumerated information element that, where present, is set to true.

Example 6 includes the subject matter of Example 3, and optionally, wherein the a second handover request acknowledge message includes an indication of an acceptance by the candidate target RAN node to modify its configuration based on the second handover request message.

Example 7 includes the subject matter of Example 6, and optionally, wherein the indication corresponds to an enumerated information element that, when present, is set to true.

Example 8 includes the subject matter of Example 3, and optionally, wherein the one or more processors are further to, prior to transmission of the updated conditional handover command, cause transmission of a message to the UE including information on the second configuration of the source RAN node.

Example 9 includes the subject matter of Example 1, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 10 includes the subject matter of Example 1, and optionally, wherein the one or more processors are to cause a cancellation of the conditional handover after configuring the UE for the conditional handover to the candidate target RAN node based on the first configuration.

Example 11 includes the subject matter of Example 1, and optionally, wherein the one or more processors are to configure the UE based on the first configuration and on the second configuration using one of X2 Application Protocol (X2AP) communications or Xn Application Protocol (XnAP) communications.

Example 12 includes the subject matter of any one of Examples 1-11, further including RF circuitry coupled to the one or more processors by the RF circuitry interface.

Example 13 includes the subject matter of Example 12, and optionally, further including one or more antennas coupled to the RF circuitry.

Example 14 includes one or more non-transitory computer-readable media comprising instructions to cause an apparatus of a source Radio Access Network (RAN) node, upon execution of the instructions by one or more processors of the device, to perform operations including: configuring a user equipment (UE) for a conditional handover of the UE from the source RAN node to a candidate target RAN node based on at least one of a first configuration of the source RAN node or conditions to be met for execution of the conditional handover; and in response to a reconfiguration of the source RAN node to a second configuration, configuring the UE for the conditional handover to the candidate target RAN node based on the second configuration by causing transmission of a message to the UE including information based on the second configuration.

Example 15 includes the subject matter of Example 14, and optionally, wherein configuring the UE based on the first configuration includes: causing transmission of a first handover request message to the candidate target RAN node including information on at least one of the first configuration of the source RAN node or a condition for the conditional handover of the UE from the source RAN node to the candidate target RAN node; processing a first handover request acknowledge message from the candidate target RAN node in response to the first handover request message, the handover request acknowledge message including a conditional handover command based on the first configuration; and causing transmission of a message to the UE based on the conditional handover command to configure the UE to execute the conditional handover to the candidate target RAN node based on the first configuration.

Example 16 includes the subject matter of Example 15, and optionally, wherein configuring the UE based on the second configuration includes: causing transmission of a second handover request message to the candidate target RAN node including information on a second configuration of the source RAN node; processing a second handover request acknowledge message from the candidate target RAN node in response to the second handover request message, the second handover request acknowledge message including an updated conditional handover command based on the second configuration; and causing transmission of a message to the UE based on the updated conditional handover command to configure the UE to execute the conditional handover to the candidate target RAN node based on the second configuration.

Example 17 includes the subject matter of Example 16, and optionally, wherein the second handover request message comprises: a radio resource control (RRC) context container including the information on the second configuration of the source RAN node; and an instruction to update the conditional handover command.

Example 18 includes the subject matter of Example 17, and optionally, wherein the instruction to update includes an enumerated information element that, where present, is set to true.

Example 19 includes the subject matter of Example 16, and optionally, wherein the second handover request acknowledge message includes an indication of an acceptance by the candidate target RAN node to modify its configuration based on the second handover request message.

Example 20 includes the subject matter of Example 19, and optionally, wherein the indication corresponds to an enumerated information element that, when present, is set to true.

Example 21 includes the subject matter of Example 16, and optionally, wherein the operations include, prior to transmission of the updated conditional handover command, causing transmission of a message to the UE including information on the second configuration of the source RAN node.

Example 22 includes the subject matter of Example 14, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 23 includes the subject matter of Example 14, and optionally, wherein the operations further include causing a cancellation of the conditional handover after configuring the UE for the conditional handover to the candidate target RAN node based on the first configuration.

Example 24 includes the subject matter of Example 14, and optionally, wherein the operations further include configuration the UE based on the first configuration and on the second configuration using one of X2 Application Protocol (X2AP) communications or Xn Application Protocol (XnAP) communications.

Example 25 includes a method to be performed by an apparatus of a source Radio Access Network (RAN) node including: configuring a user equipment (UE) for a conditional handover of the UE from the source RAN node to a candidate target RAN node based on at least one of a first configuration of the source RAN node or conditions to be met for execution of the conditional handover; and in response to a reconfiguration of the source RAN node to a second configuration, configuring the UE for the conditional handover to the candidate target RAN node based on the second configuration by causing transmission of a message to the UE including information based on the second configuration.

Example 26 includes the subject matter of Example 25, and optionally, wherein configuring the UE based on the first configuration includes: causing transmission of a first handover request message to the candidate target RAN node including information on at least one of the first configuration of the source RAN node or a condition for the conditional handover of the UE from the source RAN node to the candidate target RAN node; processing a first handover request acknowledge message from the candidate target RAN node in response to the first handover request message, the handover request acknowledge message including a conditional handover command based on the first configuration; and causing transmission of a message to the UE based on the conditional handover command to configure the UE to execute the conditional handover to the candidate target RAN node based on the first configuration.

Example 27 includes the subject matter of Example 26, and optionally, wherein configuring the UE based on the second configuration includes: causing transmission of a second handover request message to the candidate target RAN node including information on a second configuration of the source RAN node; processing a second handover request acknowledge message from the candidate target RAN node in response to the second handover request message, the second handover request acknowledge message including an updated conditional handover command based on the second configuration; and causing transmission of a message to the UE based on the updated conditional handover command to configure the UE to execute the conditional handover to the candidate target RAN node based on the second configuration.

Example 28 includes the subject matter of Example 27, and optionally, wherein the second handover request message comprises: a radio resource control (RRC) context container including the information on the second configuration of the source RAN node; and an instruction to update the conditional handover command.

Example 29 includes the subject matter of Example 28, and optionally, wherein the instruction to update includes an enumerated information element that, where present, is set to true.

Example 30 includes the subject matter of Example 27, and optionally, wherein the a second handover request acknowledge message includes an indication of an acceptance by the candidate target RAN node to modify its configuration based on the second handover request message.

Example 31 includes the subject matter of Example he sand optionally, subject matter of Example 30, and optionally, wherein the indication corresponds to an enumerated information element that, when present, is set to true.

Example 32 includes the subject matter of Example 27, and optionally, further including, prior to transmission of the updated conditional handover command to the candidate target RAN node, causing transmission of a message to the UE including information on the second configuration of the source RAN node.

Example 33 includes the subject matter of Example 25, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 34 includes the subject matter of Example 25, and optionally, further including causing a cancellation of the conditional handover after configuring the UE for the conditional handover to the candidate target RAN node based on the first configuration.

Example 35 includes the subject matter of Example 25, and optionally, further including configuring the UE based on the first configuration and on the second configuration using one of X2 Application Protocol (X2AP) communications or Xn Application Protocol (XnAP) communications.

Example 36 includes an apparatus of a target Radio Access Network (RAN) node, The device comprising: a Radio Frequency (RF) circuitry interface to send and receive messages to and from a RF circuitry; and one or more processors coupled to the RF circuitry interface, the one or more processors to: configure a user equipment (UE) for a conditional handover of the UE from a source RAN node to the target RAN node based on at least one of a first configuration of the source RAN node or conditions to be met for execution of the conditional handover; and in response to a reconfiguration of the source RAN node to a second configuration, configure the UE for the conditional handover to the target RAN node based on the second configuration by causing transmission of a message to the source RAN node including information based on the second configuration.

Example 37 includes the subject matter of Example 36, and optionally, wherein the one or more processor are to configure the UE based on the first configuration by: processing a first handover request message from the source RAN node including information on at least one of the first configuration of the source RAN node or a condition for the conditional handover of the UE from the source RAN node to the target RAN node; and causing transmission of a first handover request acknowledge message to the source RAN node in response to the first handover request message, the handover request acknowledge message including a conditional handover command based on the first configuration, the first handover request acknowledge message to cause transmission of a message from the source RAN node to the UE based on the conditional handover command to configure the UE to execute the conditional handover to the target RAN node based on the first configuration of the source RAN node.

Example 38 includes the subject matter of Example 37, and optionally, wherein the one or more processor are to configure the UE based on the second configuration by: processing a second handover request message from the source RAN node including information on a second configuration of the source RAN node; and causing transmission of a second handover request acknowledge message to the source RAN node in response to the second handover request message, the second handover request acknowledge message including an updated conditional handover command based on the second configuration, the second handover request acknowledge message to cause transmission of a message from the source RAN node to the UE based on the conditional handover command to configure the UE to execute the conditional handover to the target RAN node based on the second configuration of the source RAN node.

Example 39 includes the subject matter of Example 38, and optionally, wherein the second handover request message comprises: a radio resource control (RRC) context container including the information on the second configuration of the source RAN node; and an instruction to update the conditional handover command.

Example 40 includes the subject matter of Example 39, and optionally, wherein the instruction to update includes an enumerated information element that, where present, is set to true.

Example 41 includes the subject matter of Example 38, and optionally, wherein the a second handover request acknowledge message includes an indication of an acceptance by the target RAN node to modify its configuration based on the second handover request message.

Example 42 includes the subject matter of Example 41, and optionally, wherein the indication corresponds to an enumerated information element that, when present, is set to true.

Example 43 includes the subject matter of Example 36, and optionally, wherein the one or more processors are to process a cancellation message from the source RAN node for the conditional handover after configuring the UE for the conditional handover based on the first configuration.

Example 44 includes the subject matter of Example 36, and optionally, wherein the one or more processors are to configure the UE based on the first configuration and on the second configuration using one of X2 Application Protocol (X2AP) communications or Xn Application Protocol (XnAP) communications.

Example 45 includes the subject matter of Examples 36-44, further including RF circuitry coupled to the one or more processors by the RF circuitry interface.

Example 46 includes the subject matter of Example 45, and optionally, further including one or more antennas coupled to the RF circuitry to transmit and receive messages to transmit and receive messages.

Example 47 includes one or more non-transitory computer-readable media comprising instructions to cause an apparatus of an apparatus of a target Radio Access Network (RAN) node, upon execution of the instructions by one or more processors of The device, to perform operations including: configuring a user equipment (UE) for a conditional handover of the UE from a source RAN node to the target RAN node based on at least one of a first configuration of the source RAN node or conditions to be met for execution of the conditional handover; and in response to a reconfiguration of the source RAN node to a second configuration, configuring the UE for the conditional handover to the target RAN node based on the second configuration by causing transmission of a message to the source RAN node including information based on the second configuration.

Example 48 includes the subject matter of Example 47, and optionally, wherein the instructions include configuring the UE based on the first configuration by: processing a first handover request message from the source RAN node including information on at least one of the first configuration of the source RAN node or a condition for the conditional handover of the UE from the source RAN node to the target RAN node; and causing transmission of a first handover request acknowledge message to the source RAN node in response to the first handover request message, the handover request acknowledge message including a conditional handover command based on the first configuration, the first handover request acknowledge message to cause transmission of a message from the source RAN node to the UE based on the conditional handover command to configure the UE to execute the conditional handover to the target RAN node based on the first configuration of the source RAN node.

Example 49 includes the subject matter of Example 48, and optionally, wherein the instructions include configuring the UE based on the second configuration by: processing a second handover request message from the source RAN node including information on a second configuration of the source RAN node; and causing transmission of a second handover request acknowledge message to the source RAN node in response to the second handover request message, the second handover request acknowledge message including an updated conditional handover command based on the second configuration, the second handover request acknowledge message to cause transmission of a message from the source RAN node to the UE based on the conditional handover command to configure the UE to execute the conditional handover to the target RAN node based on the second configuration of the source RAN node.

Example 50 includes the subject matter of Example 49, and optionally, wherein the second handover request message comprises: a radio resource control (RRC) context container including the information on the second configuration of the source RAN node; and an instruction to update the conditional handover command.

Example 51 includes the subject matter of Example 50, and optionally, wherein the instruction to update includes an enumerated information element that, where present, is set to true.

Example 52 includes the subject matter of Example 49, and optionally, wherein the a second handover request acknowledge message includes an indication of an acceptance by the target RAN node to modify its configuration based on the second handover request message.

Example 53 includes the subject matter of Example 52, and optionally, wherein the indication corresponds to an enumerated information element that, when present, is set to true.

Example 54 includes the subject matter of Example 47, and optionally, wherein the instructions include processing a cancellation message from the source RAN node for the conditional handover after configuring the UE for the conditional handover based on the first configuration.

Example 55 includes the subject matter of Example 47, and optionally, wherein the instructions include configuring the UE based on the first configuration and on the second configuration using one of X2 Application Protocol (X2AP) communications or Xn Application Protocol (XnAP) communications.

Example 56 includes a method to be performed at an apparatus of an apparatus of a target Radio Access Network (RAN) node including: configuring a user equipment (UE) for a conditional handover of the UE from a source RAN node to the target RAN node based on at least one of a first configuration of the source RAN node or conditions to be met for execution of the conditional handover; and in response to a reconfiguration of the source RAN node to a second configuration prior to a change in the conditions for the conditional handover, configuring the UE for the conditional handover to the target RAN node based on the second configuration by causing transmission of a message to the source RAN node including information based on the second configuration.

Example 57 includes the subject matter of Example 56, and optionally, wherein configuring the UE based on the first configuration includes: processing a first handover request message from the source RAN node including information on at least one of the first configuration of the source RAN node or a condition for the conditional handover of the UE from the source RAN node to the target RAN node; and causing transmission of a first handover request acknowledge message to the source RAN node in response to the first handover request message, the handover request acknowledge message including a conditional handover command based on the first configuration, the first handover request acknowledge message to cause transmission of a message from the source RAN node to the UE based on the conditional handover command to configure the UE to execute the conditional handover to the target RAN node based on the first configuration of the source RAN node.

Example 58 includes the subject matter of Example 57, and optionally, wherein configuring the UE based on the second configuration includes: processing a second handover request message from the source RAN node including information on a second configuration of the source RAN node; and causing transmission of a second handover request acknowledge message to the source RAN node in response to the second handover request message, the second handover request acknowledge message including an updated conditional handover command based on the second configuration, the second handover request acknowledge message to cause transmission of a message from the source RAN node to the UE based on the conditional handover command to configure the UE to execute the conditional handover to the target RAN node based on the second configuration of the source RAN node.

Example 59 includes the subject matter of Example 58, and optionally, wherein the second handover request message comprises: a radio resource control (RRC) context container including the information on the second configuration of the source RAN node; and an instruction to update the conditional handover command.

Example 60 includes the subject matter of Example 59, and optionally, wherein the instruction to update includes an enumerated information element that, where present, is set to true.

Example 61 includes the subject matter of Example 58, and optionally, wherein the a second handover request acknowledge message includes an indication of an acceptance by the target RAN node to modify its configuration based on the second handover request message.

Example 62 includes the subject matter of Example 61, and optionally, wherein the indication corresponds to an enumerated information element that, when present, is set to true.

Example 63 includes the subject matter of Example 56, and optionally, further including processing a cancellation message from the source RAN node for the conditional handover after configuring the UE for the conditional handover based on the first configuration.

Example 64 includes the subject matter of Example 56, and optionally, further including configuring the UE based on the first configuration and on the second configuration using one of X2 Application Protocol (X2AP) communications or Xn Application Protocol (XnAP) communications.

Example 65 includes an apparatus of a user equipment (UE), the device comprising: a Radio Frequency (RF) circuitry interface to send and receive messages to and from a RF circuitry; and one or more processors coupled to the RF circuitry interface, the one or more processors to: configure the UE for a conditional handover of the UE from a source radio access network (RAN) node to a candidate target RAN node based on at least one of a first configuration of the source RAN node or conditions to be met for execution of the conditional handover by processing a first message from the source RAN node to the UE including information based on the first configuration; and in response to a reconfiguration of the source RAN node to a second configuration prior to a change in the conditions for the conditional handover, configure the UE for the conditional handover to the candidate target RAN node based on the second configuration by processing a second message from the source RAN node to the UE including information based on the second configuration.

Example 66 includes the subject matter of Example 65, and optionally, wherein the first message is based on a conditional handover command from the candidate target to configure the UE to execute the conditional handover to the candidate target RAN node based on the first configuration, and the second message is based on an updated conditional handover command from the candidate target to configure the UE to execute the conditional handover to the candidate target RAN node based on the second configuration.

Example 67 includes the subject matter of Example 65, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 68 includes the subject matter of Example 67, and optionally, further including a memory coupled to the one or more processors, wherein the one or more processors are to cause first information on a first configuration of the source RAN node, and second information on a second configuration of the source RAN node, to be stored at the memory, and to determine an updated configuration of the candidate target RAN node resulting from the second configuration of the source RAN node using the first information and the second information and without using information sent by the candidate target RAN node.

Example 69 includes the subject matter of Example 68, and optionally, wherein the candidate target RAN node includes a first candidate target RAN node and a second candidate target RAN node, the one or more processors to further determine a configuration of each of the first candidate target RAN node and the second candidate target RAN node based on the first information and the second information, wherein each of the first information and the second information includes one of full configuration information or delta information concerning configuration change information.

Example 70 includes the subject matter of Example 65, and optionally, wherein the one or more processors are to configure the UE based on the first configuration and on the second configuration using one of X2 Application Protocol (X2AP) communications or Xn Application Protocol (XnAP) communications.

Example 71 includes the subject matter of any one of Examples 65-70, further including RF circuitry coupled to the one or more processors by the RF circuitry interface.

Example 72 includes the subject matter of Example 71, and optionally, further including one or more antennas coupled to the RF circuitry.

Example 73 includes one or more non-transitory computer-readable media comprising instructions to cause an apparatus of an apparatus of a user equipment (UE), upon execution of the instructions by one or more processors of The device, to perform operations including: configuring the UE for a conditional handover of the UE from a source radio access network (RAN) node to a candidate target RAN node based on at least one of a first configuration of the source RAN node or conditions to be met for execution of the conditional handover by processing a first message from the source RAN node to the UE including information based on the first configuration; and in response to a reconfiguration of the source RAN node to a second configuration, configuring the UE for the conditional handover to the candidate target RAN node based on the second configuration by processing a second message from the source RAN node to the UE including information based on the second configuration.

Example 74 includes the subject matter of Example 73, and optionally, wherein the first message is based on a conditional handover command from the candidate target to configure the UE to execute the conditional handover to the candidate target RAN node based on the first configuration, and the second message is based on an updated conditional handover command from the candidate target to configure the UE to execute the conditional handover to the candidate target RAN node based on the second configuration.

Example 75 includes the subject matter of Example 73, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 76 includes the subject matter of Example 75, and optionally, further including a memory coupled to the one or more processors, the operations further including causing first information on a first configuration of the source RAN node, and second information on a second configuration of the source RAN node, to be stored at the memory, and determining an updated configuration of the candidate target RAN node resulting from the second configuration of the source node using the first information and the second information and without using information sent by the candidate target RAN node.

Example 77 includes the subject matter of Example 76, and optionally, wherein the candidate target RAN node includes a first candidate target RAN node and a second candidate target RAN node, the operations further including determining a configuration of each of the first candidate target RAN node and the second candidate target RAN node based on the first information and the second information, wherein each of the first information and the second information includes one of full configuration information or delta information concerning configuration change information.

Example 78 includes the subject matter of Example 73, and optionally, wherein the operations further include configuring the UE based on the first configuration and on the second configuration using one of X2 Application Protocol (X2AP) communications or Xn Application Protocol (XnAP) communications.

Example 79 includes a method to be performed at an apparatus of a user equipment (UE), including: configuring the UE for a conditional handover of the UE from a source radio access network (RAN) node to a candidate target RAN node based on at least one of a first configuration of the source RAN node or conditions to be met for execution of the conditional handover by processing a first message from the source RAN node to the UE including information based on the first configuration; and in response to a reconfiguration of the source RAN node to a second configuration, configuring the UE for the conditional handover to the candidate target RAN node based on the second configuration by processing a second message from the source RAN node to the UE including information based on the second configuration.

Example 80 includes the subject matter of Example 79, and optionally, wherein the first message is based on a conditional handover command from the candidate target to configure the UE to execute the conditional handover to the candidate target RAN node based on the first configuration, and the second message is based on an updated conditional handover command from the candidate target to configure the UE to execute the conditional handover to the candidate target RAN node based on the second configuration.

Example 81 includes the subject matter of Example 79, and optionally, wherein the message based on the second configuration of the source RAN node is a message including information on the second configuration of the source RAN node, and wherein configuring the UE for the conditional handover to the candidate target RAN node based on the second configuration of the source RAN node without causing transmission of any message to the candidate target RAN node including the information on the second configuration of the source RAN node.

Example 82 includes the subject matter of Example 81, and optionally, further including causing first information on a first configuration of the source RAN node, and second information on a second configuration of the source node, to be stored at a memory, and determining an updated configuration of the candidate target RAN node resulting from the second configuration of the source RAN node using the first information and the second information and without using information sent by the candidate target RAN node.

Example 83 includes the subject matter of Example 82, and optionally, wherein the candidate target RAN node includes a first candidate target RAN node and a second candidate target RAN node, the method further including determining a configuration of each of the first candidate target RAN node and the second candidate target RAN node based on the first information and the second information, wherein each of the first information and the second information includes one of full configuration information or delta information concerning configuration change information.

Example 84 includes the subject matter of Example 79, and optionally, further including configuring the UE based on the first configuration and on the second configuration using one of X2 Application Protocol (X2AP) communications or Xn Application Protocol (XnAP) communications.

Example 85 may include an device comprising means to perform one or more elements of a method described in or related to any of the Examples above, or any other method or process described herein.

Example 86 may include one or more non-transitory device comprising instructions to cause an electronic device, upon execution of the instructions by one or more processors of the electronic device, to perform one or more elements of a method described in or related to any of the Example above, or any other method or process described herein.

Example 87 may include an apparatus comprising logic, modules, or circuitry to perform one or more elements of a method described in or related to any of the Example above, or any other method or process described herein.

Example 88 may include a method, technique, or process as described in or related to any of the Examples above, or portions or parts thereof.

Example 89 may include an apparatus comprising: one or more processors and one or more computer-readable media comprising instructions that, when executed by the one or more processors, cause the one or more processors to perform the method, techniques, or process as described in or related to any of the Examples above, or portions thereof.

Example 90 may include a signal as described in or related to any of the Examples above, or portions or parts thereof.

Example 91 may include a datagram, packet, frame, segment, protocol data unit (PDU), or message as described in or related to any of the Examples above, or portions or parts thereof, or otherwise described in the present disclosure.

Example 92 may include a signal encoded with data as described in or related to any of the Examples above, or portions or parts thereof, or otherwise described in the present disclosure.

Example 93 may include a signal encoded with a datagram, packet, frame, segment, protocol data unit (PDU), or message as described in or related to any of the Examples above, or portions or parts thereof, or otherwise described in the present disclosure.

Example 94 may include an electromagnetic signal carrying computer-readable instructions, wherein execution of the computer-readable instructions by one or more processors is to cause the one or more processors to perform the method, techniques, or process as described in or related to any of the Examples above, or portions thereof.

Example 95 may include a computer program comprising instructions, wherein execution of the program by a processing element is to cause the processing element to carry out the method, techniques, or process as described in or related to any of the Examples above, or portions thereof.

Example 96 may include a signal in a wireless network as shown and described herein.

Example 97 may include a method of communicating in a wireless network as shown and described herein.

Example 98 may include a system for providing wireless communication as shown and described herein.

Example 99 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus of a source Radio Access Network (RAN) node, the apparatus comprising:

a Radio Frequency (RF) circuitry interface to send and receive messages to and from a RF circuitry; and one or more processors coupled to the RF circuitry interface, the one or more processors to:

send for transmission to a user equipment (UE) first UE configuration data for a conditional handover of the UE from the source RAN node to a candidate target RAN node based on a first configuration of the source RAN node and based on conditions to be met for execution of the conditional handover; and in response to a reconfiguration of the source RAN node to a second configuration prior to a satisfaction of the conditions for the conditional handover, send for transmission to the UE second UE configuration data for the conditional handover to the candidate target RAN node based on the second configuration.

2. The apparatus of claim 1, wherein the one or more processors are to:

send for transmission a first handover request message to the candidate target RAN node including information on the first configuration of the source RAN node, and further including a condition for the conditional handover of the UE from the source RAN node to the candidate target RAN node;

process a first handover acknowledge message from the candidate target RAN node in response to the first handover request message, the first handover acknowledge message including a first conditional handover command based on the first configuration; and send for transmission a message to the UE based on the first conditional handover command and including the first UE configuration data to cause the UE to execute the conditional handover to the candidate target RAN node based on the first configuration.

3. The apparatus of claim 2, wherein the one or more processors are to:

send for transmission a second handover request message to the candidate target RAN node including information on a second configuration of the source RAN node;

process a second handover acknowledge message from the candidate target RAN node in response to the second handover request message, the second handover acknowledge message including an updated conditional handover command based on the second configuration; and send for transmission a message to the UE based on the second handover request message and including the second UE configuration data to cause the UE to execute the conditional handover to the candidate target RAN node based on the second configuration.

4. The apparatus of claim 3, wherein the second handover request message comprises:

a radio resource control (RRC) context container including the information on the second configuration of the source RAN node.

5. The apparatus of claim 4, wherein the second handover request message comprises an instruction to update the first conditional handover command, and the instruction to update includes an enumerated information element that, where present, is set to true.

6. The apparatus of claim 3, wherein the second handover acknowledge message includes an indication of an acceptance by the candidate target RAN node to modify its configuration based on the second handover request message.

7. The apparatus of claim 6, wherein the indication corresponds to an enumerated information element that, when present, is set to true.

8. The apparatus of claim 3, wherein the one or more processors are further to, prior to transmission of the updated conditional handover command to the candidate target RAN node, cause transmission of a message to the UE including information on the second configuration of the source RAN node.

9. The apparatus of claim 3, wherein the one or more processors are to generate the message to the UE based on the first conditional handover command and the message based on the updated conditional handover command using one of X2 Application Protocol (X2AP) communications or Xn Application Protocol (XnAP) communications.

10. The apparatus of claim 1, further including RF circuitry coupled to the one or more processors by the RF circuitry interface.

11. The apparatus of claim 10, further including one or more antennas coupled to the RF circuitry.

12. One or more non-transitory computer-readable media comprising instructions to cause an apparatus of a source Radio Access Network (RAN) node, upon execution of the instructions by one or more processors of the apparatus, to perform operations including:

sending for transmission to a user equipment (UE) first UE configuration data for a conditional handover of a UE from the source RAN node to a candidate target RAN node based on a first configuration of the source RAN node and based on conditions to be met for execution of the conditional handover; and in response to a reconfiguration of the source RAN node to a second configuration prior to a satisfaction of the conditions for the conditional handover, sending for transmission to the UE second UE configuration data for the conditional handover to the candidate target RAN node based on the second configuration.

13. The computer-readable media of claim 12, the operations including:

sending for transmission a first handover request message to the candidate target RAN node including information on the first configuration of the source RAN node, and further including a condition for the conditional handover of the UE from the source RAN node to the candidate target RAN node;

processing a first handover acknowledge message from the candidate target RAN node in response to the first handover request message, the first handover acknowledge message including a first conditional handover command based on the first configuration; and sending for transmission a message to the UE based on the first conditional handover command and including the first UE configuration data to cause the UE to execute the conditional handover to the candidate target RAN node based on the first configuration.

14. The computer-readable media of claim 13, the operations further including:

sending for transmission a second handover request message to the candidate target RAN node including information on a second configuration of the source RAN node;

processing a second handover acknowledge message from the candidate target RAN node in response to the second handover request message, the second handover acknowledge message including an updated conditional handover command based on the second configuration; and sending for transmission a message to the UE based on the updated conditional handover command and including the second UE configuration data to cause the UE to execute the conditional handover to the candidate target RAN node based on the second configuration.

15. The computer-readable media of claim 14, wherein the second handover request message comprises an instruction to update the first conditional handover command, and wherein the instruction to update includes an enumerated information element that, where present, is set to true.

16. The computer-readable media of claim 14, wherein the operations further include generating the message to the UE based on the first conditional handover command and the message based on the updated conditional handover command using one of X2 Application Protocol (X2AP) communications or Xn Application Protocol (XnAP) communications.

17. A method to be performed at an apparatus of a target Radio Access Network (RAN) node including:

sending for transmission to a user equipment (UE) first UE configuration data for a conditional handover of the UE from a source RAN node to a candidate target RAN node based on a first configuration of the source RAN node and based on conditions to be met for execution of the conditional handover; and in response to a reconfiguration of the source RAN node to a second configuration prior to a satisfaction of the conditions for the conditional handover, sending for transmission to the UE second UE configuration data for the conditional handover to the candidate target RAN node based on the second configuration.

18. The method of claim 17, further comprising:

processing a first handover request message from the source RAN node including information on the first configuration of the source RAN node and a condition for the conditional handover of the UE from the source RAN node to the target RAN node; and sending for transmission a first handover request acknowledge message to the source RAN node in response to the first handover request message, the handover request acknowledge message including a first conditional handover command based on the first configuration, the first handover request acknowledge message to trigger transmission of a message from the source RAN node to the UE based on the first conditional handover command to trigger a configuration of the UE to execute the conditional handover to the target RAN node based on the first configuration of the source RAN node.

19. The method of claim 18, further comprising:

processing a second handover request message from the source RAN node including information on a second configuration of the source RAN node; and sending for transmission a second handover request acknowledge message to the source RAN node in response to the second handover request message, the second handover request acknowledge message including an updated conditional handover command based on the second configuration, the second handover request acknowledge message to trigger transmission of a message from the source RAN node to the UE based on the updated conditional handover command to configure the UE to execute the conditional handover to the target RAN node based on the second configuration of the source RAN node.

20. The method of claim 19, wherein the second handover request message comprises:

a radio resource control (RRC) context container including the information on the second configuration of the source RAN node.

21. The method of claim 20, wherein the second handover request message comprises an instruction to update the first conditional handover command, and the instruction to update includes an enumerated information element that, where present, is set to true.

22. The method of claim 19, further including generating the first handover request acknowledge message and the second handover request acknowledge message using one of X2 Application Protocol (X2AP) communications or Xn Application Protocol (XnAP) communications.

23. An apparatus of a user equipment (UE), the apparatus comprising:

a Radio Frequency (RF) circuitry interface to send and receive messages to and from a RF circuitry; and one or more processors coupled to the RF circuitry interface, the one or more processors to:

configure the UE for a conditional handover of the UE from a source radio access network (RAN) node to a candidate target RAN node based on at least one of a first configuration of the source RAN node or conditions to be met for execution of the conditional handover by processing a first message from the source RAN node to the UE including information based on the first configuration; and in response to a reconfiguration of the source RAN node to a second configuration, configure the UE for the conditional handover to the candidate target RAN node based on the second configuration by processing a second message from the source RAN node to the UE including information based on the second configuration.

24. The apparatus of claim 23, wherein the first message is based on a first conditional handover command from the candidate target RAN node to trigger a configuration of the UE to execute the conditional handover to the candidate target RAN node based on the first configuration, and the second message is based on an updated conditional handover command from the candidate target to trigger a configuration of the UE to execute the conditional handover to the candidate target RAN node based on the second configuration.

25. The apparatus of claim 24, wherein the message based on the second configuration of the source RAN node is a message including information on the second configuration of the source RAN node, and wherein triggering a configuration of the UE for the conditional handover to the candidate target RAN node based on the second configuration of the source RAN node is to occur without causing transmission of any message to the candidate target RAN node including the information on the second configuration of the source RAN node.

* * * * *